United States Patent [19]
Ito et al.

[11] Patent Number: 5,917,678
[45] Date of Patent: Jun. 29, 1999

[54] HEAD SLIDER AND RECORDING-AND-REPRODUCING APPARATUS

[75] Inventors: Jun Ito, Yokohama; Yoshiyuki Kawakami, Suginami-Ku, both of Japan

[73] Assignee: Kabushiki Kaisha Toshiba, Kawasaki, Japan

[21] Appl. No.: 08/722,766

[22] Filed: Sep. 27, 1996

[51] Int. Cl.$^6$ .................................................. G11B 5/60
[52] U.S. Cl. .............................................................. 360/103
[58] Field of Search ............................................. 360/103

[56] References Cited

U.S. PATENT DOCUMENTS 5,418,667   5/1995   Best et al. ................................ 360/103
5,424,888   6/1995   Hendriks et al. ........................ 360/103

*Primary Examiner*—Robert S. Tupper
*Attorney, Agent, or Firm*—Foley & Lardner

[57] ABSTRACT

A head slider supporting a read/write head for recording and reproducing information is disposed above a disk, i.e., an information recording medium. The head slider has on its surface facing the disk at least two transversely elongate dynamic pressure generating parts formed with their longer sides extended substantially perpendicularly to the rotating direction of the disk and arranged one behind the other in the rotating direction. The front dynamic pressure generating part is provided with a land of a length in the rotating direction of the disk greater than 10% and smaller than 50%. The land protrudes toward the disk and has a shoulder.

2 Claims, 21 Drawing Sheets

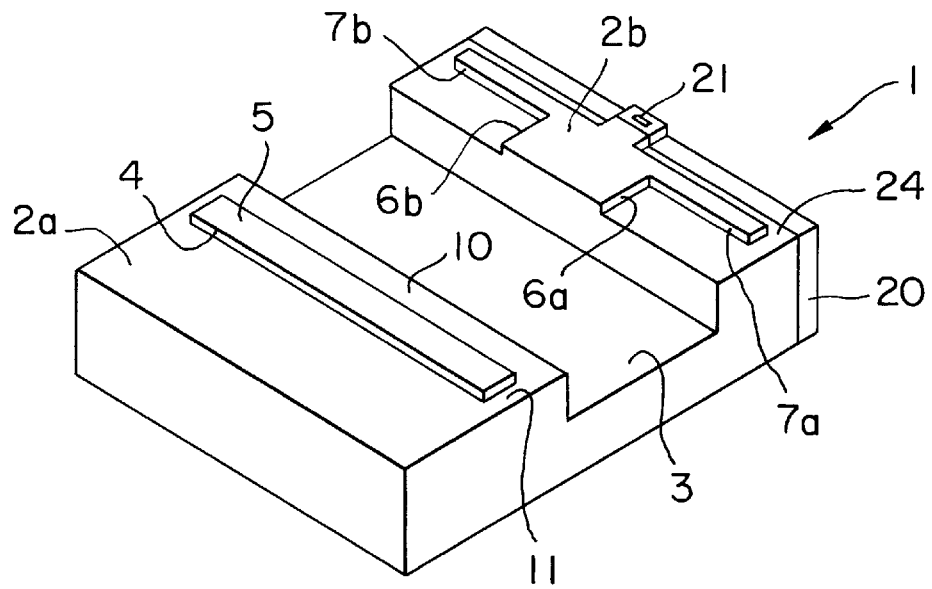
F I G. 22 A
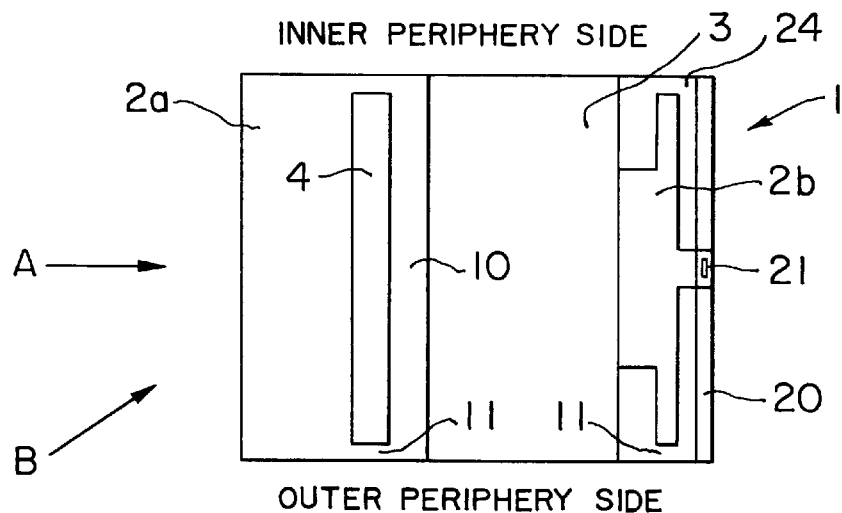
F I G. 22 B
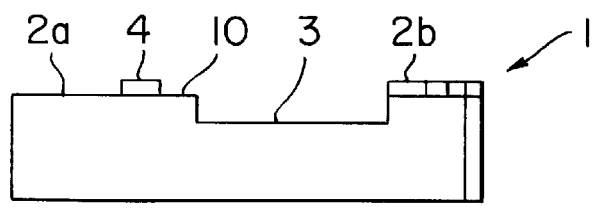
F I G. 22 C

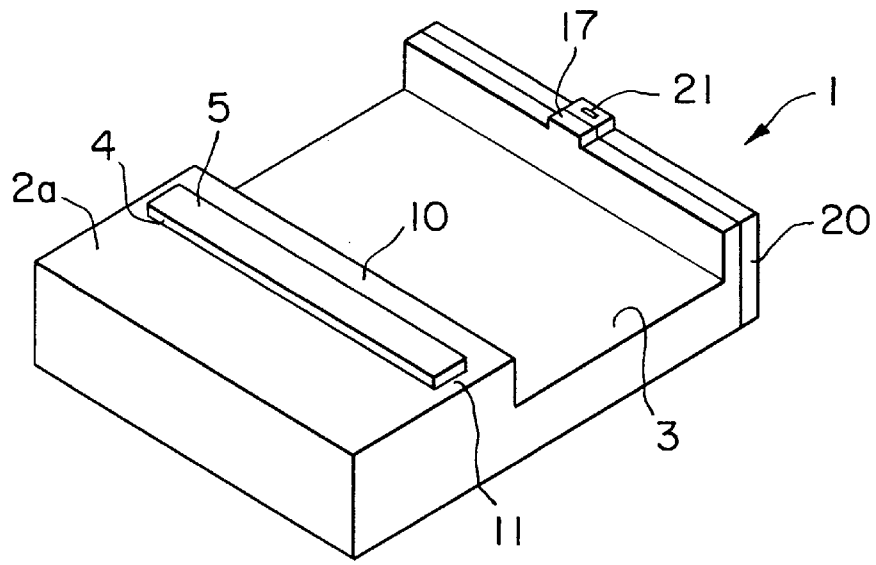
F I G. 23 A
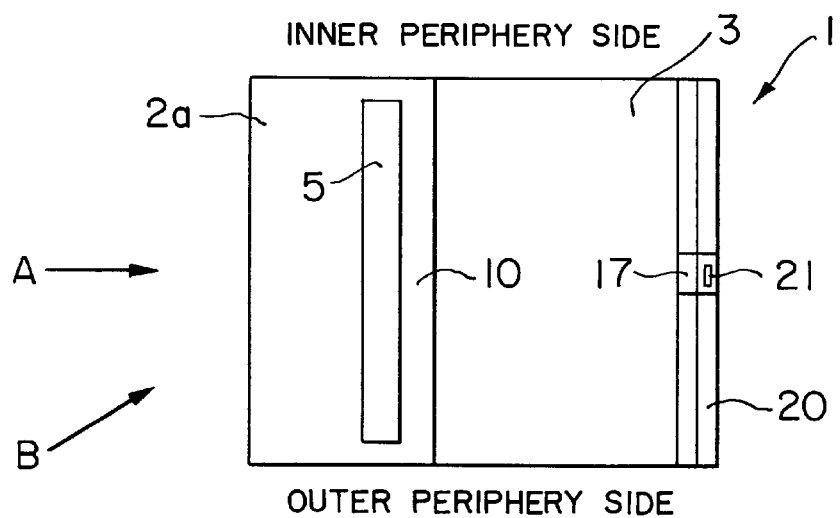
F I G. 23 B
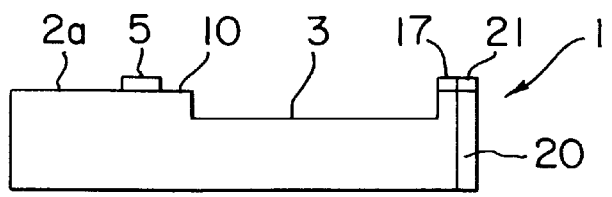
F I G. 23 C

HEAD SLIDER AND RECORDING-AND-REPRODUCING APPARATUS

BACKGROUND OF THE INVENTION

1. Field of the Invention

The present invention relates to a head slider capable of suppressing the variation and irregularity of flying height, or the variation of contact pressure, and a recording-and-reproducing apparatus provided with such a head slider for supporting a read/write head at a low flying height or supporting a read/write head in small-force, stable contact with a recording medium to enable recording at a high recording density.

2. Description of the Related Art

Active efforts have been made in recent years for the development of techniques necessary to achieve high-density recording by recording-and-reproducing apparatus. Attempts to increase both bit density (recording density with respect to a circumferential direction of a disk) and track density (recording density with respect to the radial direction of a disk) have been made to increase recording density when recording information by a magnetic disk recording-and-reproducing apparatus. The reduction of the flying height of a head slider (hereinafter referred to simply as "slider") supporting a read/write head (hereinafter referred to simply as "head") is essential to increasing bit density. However, the flying height of a conventional slider is subject to dynamic variation during a seek operation, which is an obstacle to the reduction of the flying height of the conventional slider. Causes of the dynamic variation of the flying height of the current slider will be described below.

FIG. 19 schematically shows a magnetic disk drive provided with a general slider 101. Positional flying height difference, i.e., the difference between the flying height of the slider 101, typically, a taper flat slider, when the slider 101 is at a position corresponding to an inner peripheral portion of a disk 102, i.e., an information recording medium, and that of the same when the slider 101 is at a position corresponding to an outer peripheral portion of the disk 102, is suppressed, in most cases, by using the yaw angle dependence of flying height. Yaw angle is the angle θ between the direction of rotation of the disk and the longitudinal axis of the slider 101. As shown in FIG. 19, in a general magnetic disk drive, an actuator 103 for positioning a head is disposed relative to the disk 102 so that the yaw angle is small when the slider 102 is in an inner peripheral portion X of the disk 102, and large when the slider 102 is in an outer peripheral portion Y of the same.

Referring to FIG. 21 showing the taper flat slider 101 in a schematic perspective view, the taper flat slider 101 has elongate dynamic pressure generating parts 101a extending in the rotating direction A of the disk 102, i.e., a direction in which the disk 102 rotates relative to the longitudinal axis of the slider 101. The slider 101 is kept flying over the disk 102 by dynamic pressures generated in spaces between the dynamic pressure generating parts 101a and the rotating disk 102. The pressure generating efficiency of the dynamic pressure generating parts 101a extending in the rotating direction A of the disk is reduced when the rotating direction A of the disk relative to the slider changes to a rotating direction B relative to the disk due to the yawing of the slider at a yaw angle relative to the rotating direction A. Whereas air currents flow through a relatively long entire length of the slider from the front end of the same and contributes effectively to the generation of dynamic pressure when the yaw angle of the slider is relatively small, part of the air current flows obliquely from the front end of the slider and leaves the slider from tie side edge of the same, another part of the air current flows obliquely from the side edge of the slider and leaves the slider from the back end of the same and hence air currents are unable to flow through a distance necessary for generating an effective dynamic pressure when the yaw angle of the slider is relatively large. Such a flow of air currents oblique to the slider is called air current leakage. Therefore, when the yaw angle of the prior art taper flat slider 101 increases as the taper flat slider 101 moves toward the outer peripheral protion Y of the disk, the dynamic pressure generating efficiency decreases. Consequently, the hydrodynamic force acting on the slider 101 does not vary because when the slider 101 moves toward the outer peripheral portion Y of the disk where the circumferential speed is higher than that in the inner peripheral portion X and hence the positional variation of the flying height of the slider 101 can be suppressed.

Incidentally, the disk 102 has a circumferential speed component $V_r$ (5 to 10 m/s), i.e., a circumferential speed relative to the slider 102, and, when the slider 102 is moved for a seek operation, a seek speed component $V_s$ (about 1 m/s at a maximum), i.e., a radial speed relative to the slider 102, perpendicular to the circumferential speed $V_r$ as shown in FIG. 20. Therefore, the direction of the resultant vector V of the circumferential speed component $V_r$ and the seek speed component $V_s$ is inclined at an angle in the range of 5° to 10° to the longitudinal axis of the slider 101. Therefore, an equivalent yaw angle change θ' is added to the yaw angle of the slider 102 during the seek operation. Since the dynamic pressure generating efficiency is reduced during the seek operation due to the transverse leakage of air currents from the dynamic pressure generating parts 101a during the seek operation on the same principle as that of yaw angle dependence as explained with reference to FIG. 21 transient flying height reduction occurs. It has been verified through experiments that, in general, the magnitude of transient flying height reduction is greater than 10 nm. Therefore, the space between the slider 101 and the disk 102 in an on-tracking state must be determined allowing for an allowance for the flying height reduction in a seeking state. Such a yaw-angle-dependent variation of the flying height is a significant factor that obstructs the reduction of the flying height.

A contact recording technique has been examined with an intention to further increase recording density. The contact recording technique sets a head in contact with a disk 102 so that the flying height is substantially zero. The reduction of abrasion of the head is the most important technical problem in the contact recording technique. The contact force between the head and the disk must be low and stable to reduce the abrasion of the head. However, as mentioned above, the contact force between the current slider 101 and the disk 102 varies with the variation of the equivalent yaw angle and hence it is impossible to maintain a low, stable contact force between the slider 101 and the disk 102. When the head is abraded greatly, a contact part of the head to be kept in contact with the disk 102 may possibly be spaced from the surface of the disk 102 when the flying height of the slider 101 changes between the inner peripheral portion and the outer peripheral portion of the disk 102.

When a head provided with a magnetoresistance-effect device, i.e., an MR head which has recently been applied to practical uses and is expected to be prevalently used in the future, is employed, a recording-and-reproducing apparatus needs a write head and a read head. Generally, the two heads are arranged in the direction of arrangement of tracks. In such a configuration, the two heads are dislocated relative to each other in the direction of the width of tracks (tracking dislocation) when the yaw angle changes greatly between the inner peripheral portion and the outer peripheral portion of the disk. A method intended to solve such a problem employs a linear actuator, and another method proposed in JP-A No. 5-298615 employs an actuator arm having an appropriate length to reduce the variation of the yaw angle. Therefore, it is highly possible that a method of suppressing the variation of the flying height without using the yaw angle dependence is necessary for a slider supporting an MR head.

As explained above, the conventional slider 10 utilizes yaw angle dependence to reduce the positional flying height difference. Consequently, the flying height is reduced or the contact force varies due to the equivalent yaw angle variation during the seek operation. Accordingly, it is difficult to reduce the flying height of the head or to keep the head in contact with the disk at a low, stable contact pressure. When the head is abraded excessively by the contact recording operation and the flying position of the head varies between the inner peripheral portion and the outer peripheral portion of the disk 102, it is possible that the contact part of the head is separated from the surface of the disk 102 and a space is formed between the contact part of the head and the surface of the disk 102. Moreover, a slider supporting an MR head requires a method of reducing the positional flying height difference without using yaw angle dependence.

SUMMARY OF THE INVENTION

Accordingly, it is an object of the present invention to provide a slider of a shape capable of solving the foregoing problems and of reducing the positional flying height difference or suppressing the variation of contact force without using yaw angle dependence.

Another object of the present invention is to provide a recording-and-reproducing apparatus employing a slider of a shape capable of solving the foregoing problems and of reducing the positional flying height difference or suppressing the variation of contact force without using yaw angle dependence, and capable of supporting a head at a reduced flying height or supporting a head in contact with a disk at a low, stable contact force to enhance recording density.

According to a first aspect of the present invention, a head slider disposed above an information recording medium supported for rotation having a surface facing the information recording medium, and supporting a read/write head for recording and reproducing information comprises: a plurality of dynamic pressure generating parts extending substantially perpendicularly to a rotating direction of the information recording medium. A land provided with a front dynamic pressure generating part at a foremost position with respect to the rotating direction of the information recording medium among the plurality of dynamic pressure generating parts protruds toward the information recording medium, extends in a direction in which the front dynamic pressure generating part extend, and has a length in the range of 10% to 50% of the length of the front dynamic pressure generating part along the rotating direction of the Information recording medium.

According to a second aspect of the present invention, a head slider disposed above an information recording medium supported for rotation, having a surface facing the information recording medium, and supporting a read/write head for recording and reproducing information comprising: a substantially U-shaped land opening in a hind direction with respect to the rotating direction of the information recording medium, provided with the surface facing the information recording medium, and protruding toward the information recording medium, wherein both side portions of the land are cut to form shoulders extending in the rotating direction of the information recording medium in the side portions, respectively.

According to a third aspect of the present invention, a head slider disposed above an information recording medium supported for rotation, having a surface facing the information recording medium and supporting a read/write head for recording and reproducing information a dynamic pressure generating part provided with the surface facing the information recording medium. Both side portions of the dynamic pressure generating part are cut to form shoulders extending substantially in the rotating direction of the information recording medium in the side portions.

According to a fourth aspect of the present invention, a head slider disposed above an information recording medium supported for rotation, having a surface facing the information recording medium and supporting a read/write head for recording and reproducing information comprises: a dynamic pressure generating part provided with the surface facing the information recording medium. Both side portions of the dynamic pressure generating part are cut to form shoulders extending substantially in the rotating direction of the information recording medium and shoulders extending substantially perpendicularly to the rotating direction of the information recording medium in the side portions, respectively.

According to a fifth aspect of the present invention, a head slider disposed above an information recording medium supported for rotation, having a surface facing the information recording medium and supporting a read/write head for recording and reproducing information comprising: a dynamic pressure generating part formed in a front section of the surface facing the information recording medium with respect to the rotating direction of the information recording medium so as to extend substantially perpendicularly to the rotating direction of the information recording medium, and a pad part formed in a back section of the surface facing the information recording medium with respect to the rotating direction of the information recording medium so as to be in contact with the information recording medium during operation and holding the read/write head thereon. A land provided with the dynamic pressure generating part protruding toward the information recording medium and extending in a direction in which the dynamic pressure generating part extends, and has a length in the rotating direction of the information recording medium is in the range of 10% to 50% of the length of the dynamic pressure generating part in the rotating direction of the information recording medium.

According to a sixth aspect of the present invention, a recording-and-reproducing apparatus comprises: an information recording medium supported for rotation; a read/write head for reading information from and writing information on the information recording medium; a head slider having a surface facing the information recording medium and supporting the read/write head; and an actuator supporting the head slider to move the head slider over the information recording medium. The head slider comprises a plurality of dynamic pressure generating parts provided with the surface facing of the information medium formed so as to extend substantially perpendicularly to the rotating direction of the information recording medium. A land provided with a front dynamic pressure generating part at a foremost position with respect to the rotating direction of the information recording medium among the plurality of dynamic pressure generating parts protruds toward the information recording medium, extending in a direction in which the front dynamic pressure generating part extend, and has a length in the range of 10% to 50% of the length of the front dynamic pressure generating part along the rotating direction of the information recording medium.

According to a seventh aspect of the present invention, a recording-and-reproducing apparatus comprises: a rotating information recording medium; a read/write head for reading information from and writing information on the information recording medium; a head slider having a surface facing the information recording medium and supporting the read/write head; and an actuator supporting the head slider to move the head slider over the information recording medium. The head slider comprises: a substantially U-shaped land opening in a hind direction with respect to the rotating direction of the information recording medium, provided with the surface facing the information recording medium, and protruding toward the information recording medium. Both side portions of the substantially U-shaped land are cut to form shoulders extending in the rotating direction of the information recording medium in the side portions, respectively.

According to an eighth aspect of the present invention, a recording-and-reproducing apparatus comprises: a rotating information recording medium; a read/write head for reading information from and writing Information on the information recording medium; a head slider having a surface facing the information recording medium, and supporting the read/write head: and an actuator supporting the head slider to move the head slider over the information recording medium. The head slider comprising: a dynamic pressure generating part provided with the surface facing the information recording medium. The both side portions of the dynamic pressure generating part are cut to form shoulders extending substantially in the rotating direction of the information recording medium in the side portions.

According to a ninth aspect of the present invention, a recording-and-reproducing apparatus comprises: a rotating information recording medium; a read/write head for reading information from and writing information on the information recording medium; a head slider having a surface facing the information recording medium and supporting the read/write head; and an actuator supporting the head slider to move the head slider over the information recording medium. The head slider comprises: a dynamic pressure generating part provided with the surface facing the information medium. The both side portions of the dynamic pressure generating part are cut to form shoulders extending substantially in the rotating direction of the information recording medium and shoulders extending substantially perpendicularly to the rotating direction of the information recording medium in the side portions, respectively.

According to a tenth aspect of the present invention, a recording-and-reproducing apparatus comprises: a rotating information recording medium; a read/write head for reading information from and writing information on the information recording medium; a head slider having a surface facing the information recording medium and supporting the read/write head; and an actuator supporting the head slider to move the head slider over the information recording medium. The head slider comprises: a dynamic pressure generating part formed in a front section of the surface facing the information recording medium with respect to the rotating direction of the information recording medium so as to extend substantially perpendicular to the rotating direction of the information recording medium, and a pad part formed in a back section of the surface facing the information recording medium with respect to the rotating direction of the information recording medium so as to be in contact with the information recording medium during operation and holding the read/write head thereon. A land is provided with the dynamic pressure generating part has a land protruding toward the information recording medium, extends in a direction in which the dynamic pressure generating part extends, and has length in the range of 10% to 50% of the length of the dynamic pressure generating part in the rotating direction of the information recording medium.

Preferred embodiments of the present invention will become understood from the following detailed description referring to the accompanying drawings.

BRIEF DESCRIPTION OF THE DRAWINGS

FIG. 22A is a perspective view of another head slider in the fifth embodiment according to the present invention.

FIG. 22B is a plan view of the head slider of FIG. 22A.

FIG. 22C is a side view of the head slider of FIG. 22A.

FIG. 23A is a perspective view of another head slider in the eighth embodiment according to the present invention.

FIG. 23B is a plan view of the head slider of FIG. 23A.

FIG. 23C is a side view of the head slider of FIG. 23A.

DETAILED DESCRIPTION OF THE PREFERRED EMBODIMENTS

First Embodiment

Preferred embodiments of the present invention will be described hereinafter with reference to the accompanying drawings as applied to a magnetic disk drive as an example of a recording-and-reproducing apparatus. It is to be understood that the present invention is not limited in its practical application to the magnetic disk drive specifically described herein, but the same is applicable to other recording-and-reproducing apparatuses having a slider supporting a head.

A magnetic disk drive (recording-and-reproducing apparatus) will briefly described prior to the description of the preferred embodiments of the present invention.

Figure 1:
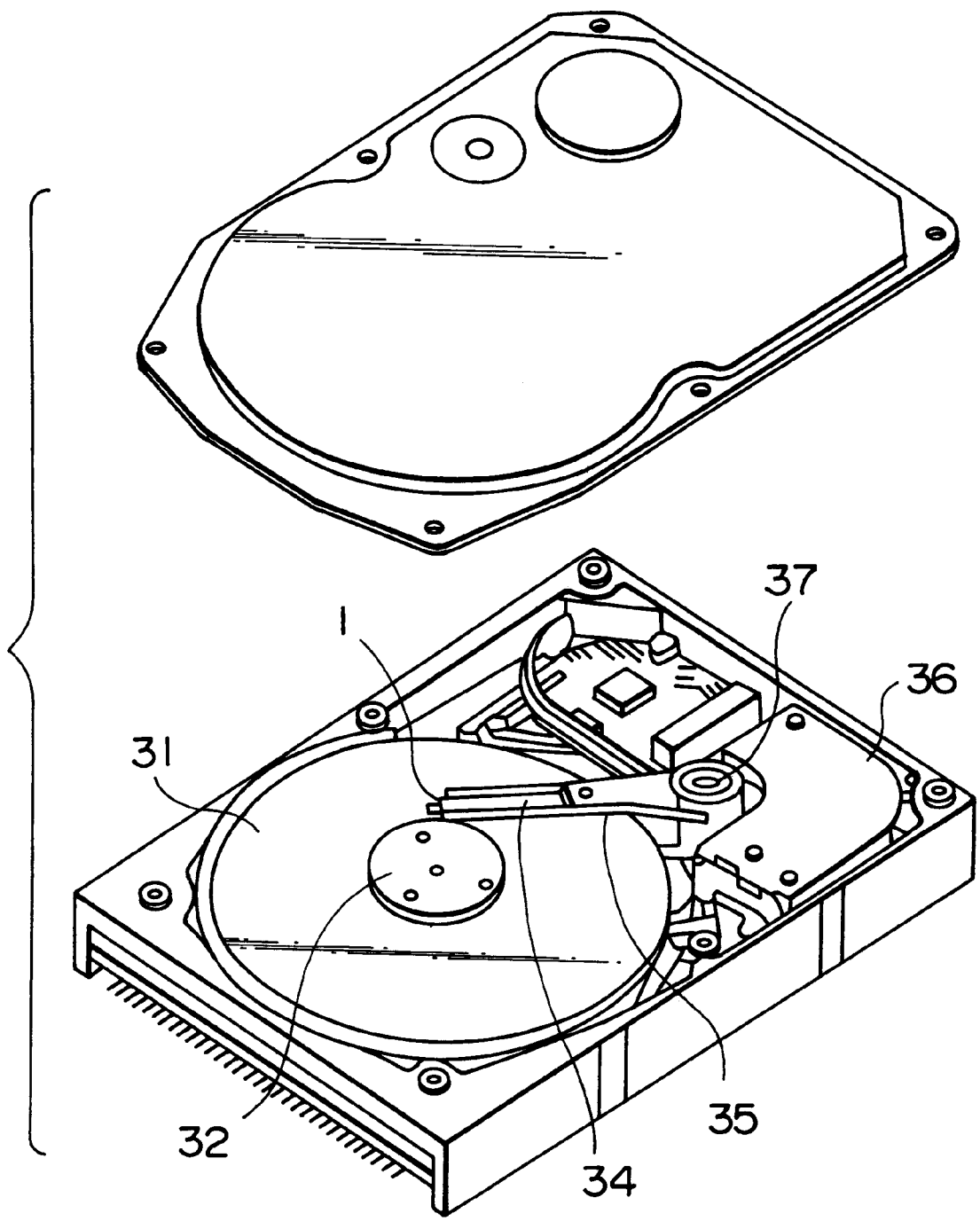
FIG. 1 is a schematic perspective view of a magnetic disk drive in a preferred embodiment according to the present invention.

Referring to FIG. 1 schematically showing a magnetic disk drive employing a rotary actuator, a disk (information recording medium) 31 is mounted on a spindle 32 and rotated at a predetermined rotating speed. A head slider 1 mounted with a magnetic read/write head 20 to be brought into contact with the disk 31 for information recording and reproducing is attached to the free end of a suspension arm 34 having the shape of a thin plate. The suspension arm 34 is connected to one end of an actuator arm 35. The actuator arm 35 is provided with a bobbin holding a drive coil, not shown, and such. The other end of the actuator arm 35 is connected to a voice coil motor 36, i.e., a linear motor. The voice coil motor 36 comprises the drive coil, not shown, held on the bobbin attached to the actuator arm 35, and a magnetic circuit including permanent magnets disposed opposite to each other on the opposite sides of the drive coil, respectively, and a counter yoke. The actuator arm 35 is supported on a fixed shaft 37 by ball bearings, not shown, put on upper and lower portions of the fixed shaft 37, respectively, so as to be turned by the voice coil motor 36.

Figure 16:
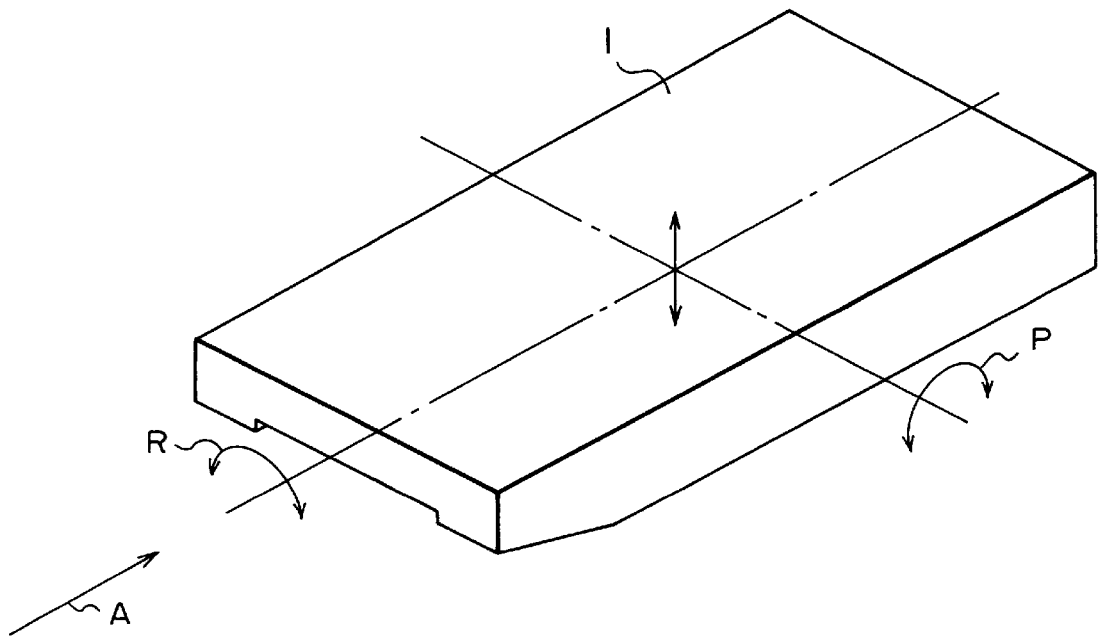
FIG. 16 is a perspective view of a head slider for assistance in explaining the rolling and pitching motions of the head slider.

The head slider 1 is held by a flexible member, such as a gimbals, on the suspension arm 34 in a position conforming to the disk 31 and is kept flying above the disk 31 by a dynamic pressure generated by the rotating disk 31. The position of the head slider 1 is caused to change minutely by errors introduced into components during manufacture or by the variation of the dynamic pressure. Such changes in the position of the head slider 1 are called a rolling motion and a pitching motion. The rolling motion is a turning motion about the longitudinal axis of the head slider 1 (rolling) as indicated by the arrow R in FIG. 16, and the pitching motion is a turning motion about a transverse axis of the head slider 1 perpendicular to the longitudinal axis of the same (pitching) as indicated by the arrow P in FIG. 16.

The head slider (hereinafter referred to simply as "slider") will be described with reference to FIGS. 2A to 2C.

Figure 2A:
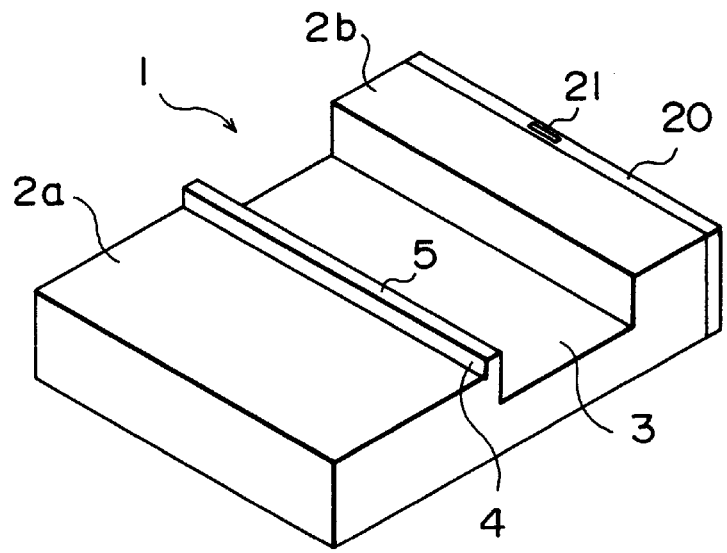
FIG. 2A is a perspective view of a head slider in a first embodiment according to the present invention.
Figure 2B:
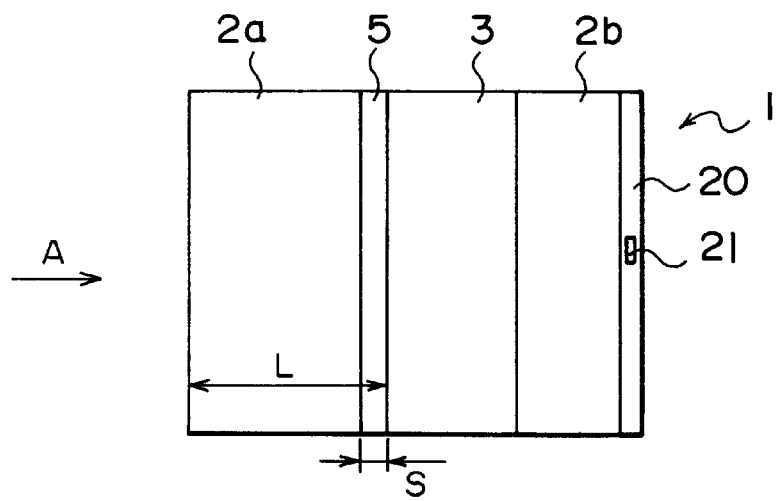
FIG. 2B is a plan view of the head slider of FIG. 2A.
Figure 2C:
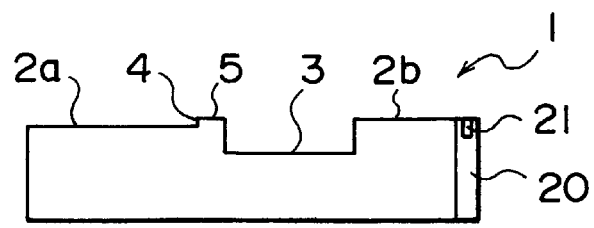
FIG. 2C is a side view of the head slider of FIG. 2A.

FIGS. 2A, 2B and 2C are a perspective view, a plan view and a side view, respectively, of a slider in a first embodiment according to the present invention. As mentioned above in connection with the prior art, the reduction of the dynamic pressure generating efficiency due to the transverse leakage of air current in a direction perpendicular to the rotating direction A, causes the variation of flying height attributable to the variation of an equivalent yaw angle during a seek operation. Such variation of flying height is conspicuous with sliders having a dynamic pressure generating part having a big length in the rotating direction A of the disk, typically, taper flat sliders. Therefore, it is desirable that the slider 1 has transversely elongate dynamic pressure generating parts 2a and 2b extending in a direction perpendicular to the rotating direction A of the disk as shown in FIGS. 2A to 2C to reduce yaw angle dependence. When formed in a transversely elongate shape, the slider 1 has a low pitching stiffness. Therefore, the slider 1 of this embodiment is provided with the transversely elongate dynamic pressure generating parts 2a and 2b having longer sides extending in a direction substantially perpendicular to the rotating direction A of the disk 31 and arranged one behind the other with respect to the rotating direction A of the disk 31. The dynamic pressure generating parts 2b are spaced by a deep groove 3 which contributes scarcely to dynamic pressure generation. The deep groove 3 is formed by machining or etching.

Although the transient variation of flying height can be suppressed through the reduction of yaw angle dependence when the dynamic pressure generating part 2a and 2b are formed in transversely elongate shapes, positional flying height difference, i.e., the difference between a flying height when the slider 1 is et a position corresponding to an inner peripheral portion of the disk 31 and a flying height when the slider 1 is at a position corresponding to an outer peripheral portion of the disk 31, increases. Therefore, in this embodiment, the dynamic pressure generating part 2a on the front side with respect to the rotating direction A of the disk 21, i.e., the dynamic pressure generating part on the left-hand side as viewed in FIG. 2B, is provided with a land 5 in its back portion, i.e., a portion on the right-hand side as viewed in FIG. 28. The land 5 has a shoulder 4, extending in a direction substantially perpendicular to the rotating direction A of the disk 31 and protruding toward the disk 31 to reduce positional flying height difference without using yaw angle dependence. The land 5 having the shoulder 4 is formed by etching with a portion corresponding to the land 5 masked. Desirably, the height of the shoulder 4 Is approximately equal to the flying height of the land 5, and hence the height of the shoulder 4 may be very small. Therefore the land 5 can be formed in a short time and the portion corresponding to the land 5 can easily be masked. When the respective surfaces of the land 5 and the back dynamic pressure generating part 2b disposed are flush with each other, the dynamic pressure generating parts can be formed by a single etching cycle, which improves manufacturing efficiency and is suitable for mass production.

In FIGS. 2A and 2B a surface of the slider 1 facing the disk 31 is shown. The read/write head 20 having magnetic poles 21 is held on the back surface of the slider 1.

The performance of the slider 1 of such a structure in reducing positional flying height difference will be described below.

Figure 3:
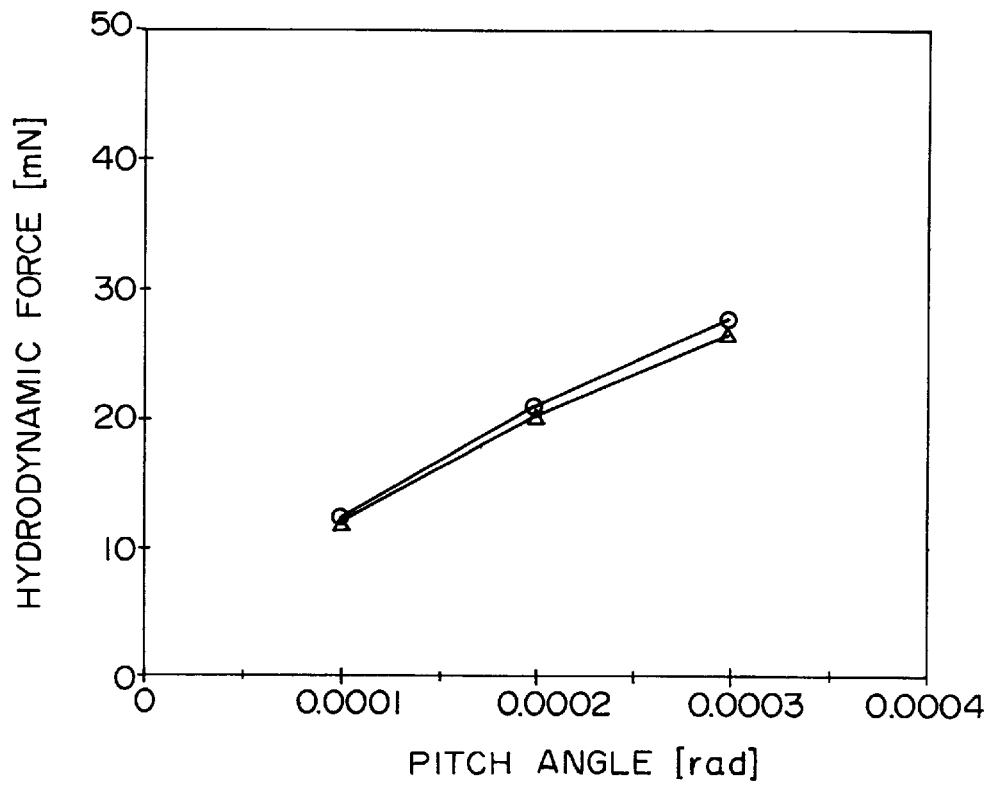
FIG. 3 is a graph showing a variation of hydrodynamic force with a pitch angle of a back dynamic pressure generating part when a space between the back end of a slider and an information recording medium is fixed.

The back dynamic pressure generating part 2b has a transversely elongate flat surface extending with its shorter sides in parallel to the rotating direction A of the disk 31 and the longer side in parallel to a direction perpendicular to the rotating direction A of the disk 31. In operation, the back dynamic pressure generating part 2b rises as the front dynamic pressure generating part 2a is raised and the slider 1 is tilted at a pitch angle. FIG. 3 is a graph showing the variation of hydrodynamic force with pitch angle of the back dynamic pressure generating part when the space between the back end of the back dynamic pressure generating part 2b and the disk 31 is fined, in which a mark ○ indicates hydrodynamic force acting on the back dynamic pressure generating part 2b when the slider 1 is at a position corresponding to an outer peripheral portion of the disk 31 and a mark Δ indicates hydrodynamic force acting on the back dynamic pressure generating part 2b when the slider 1 is at a position corresponding to an inner peripheral portion of the disk 31. As is obvious from FIG. 3, the difference between the hydrodynamic force acting on the back dynamic pressure generating part 2b at a position corresponding to the inner peripheral portion of the disk 31 and that acting on the same at a position corresponding to the outer peripheral portion of the disk 31 is insignificant when the pitch angle is substantial; that is, the effect of the variation of the pitch angle on the variation of the hydrodynamic force is greater than that of the difference in circumferential speed between the inner and outer peripheral portions of the disk 31. Therefore, the positional flying height difference can be reduced without using yaw angle dependence by keeping the pitch angle of the slider 1 substantially constant. Thus, the space between the back end of the back dynamic pressure generating part 2b and the disk 31 can be kept constant regardless of the circumferential speed difference between the inner and outer peripheral portions of the disk 31 by designing the shape of the front dynamic pressure generating part 2a so that the pitch angle of the slider 1 may not change between positions corresponding to an inner and an outer peripheral portion of the disk 31.

Figure 4:
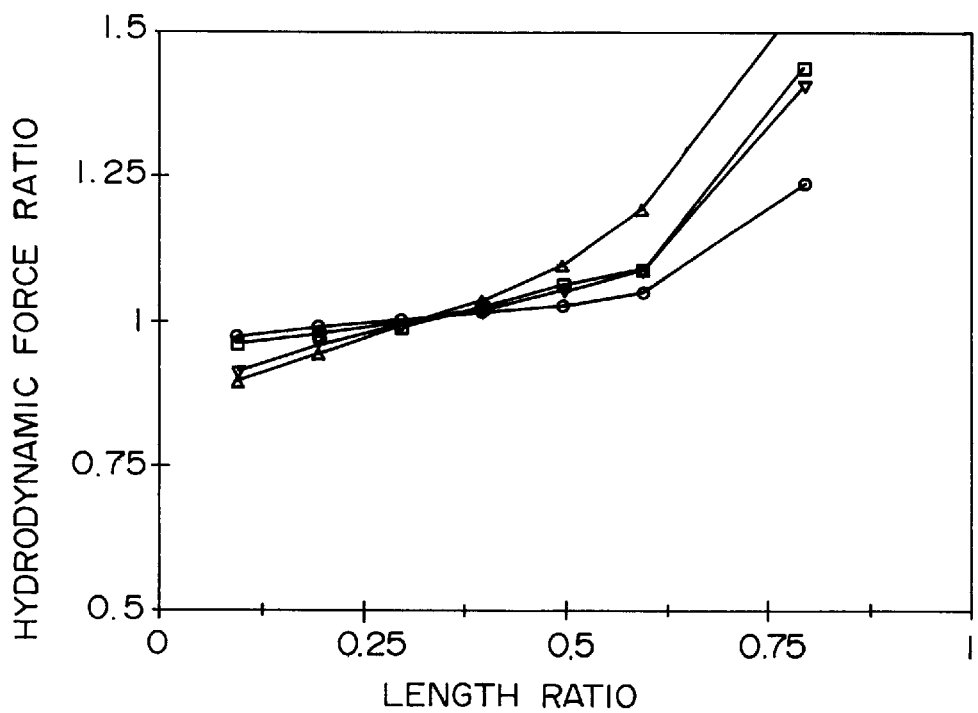
FIG. 4 is a graph showing the variation of hydrodynamic force ratio, i.e., the ratio of a hydrodynamic force acting on a slider at a position corresponding to an outer peripheral portion of a disk to that acting on the slider at a position corresponding to an inner peripheral portion of the disk, with length ratio, I.e., the ratio of the length S of a land in the rotating direction of the disk to the length L of a front dynamic pressure generating part in the same direction, when the space between the back end of the slider and the disk is fixed.

FIG. 4 is a graph showing the variation of hydrodynamic force ratio, i.e., the ratio of hydrodynamic force acting on the front dynamic pressure generating part 2a shown in FIG. 2B at a position corresponding to an outer peripheral portion of disk 31 to that acting on the front dynamic pressure generating part 2a at a position corresponding to an inner peripheral portion of the disk 31, with land/length ratio, i.e., the ratio of the length S of the land 5 in the rotating direction of the disk 31 to the length L of the front dynamic pressure generating part 2a in the same direction for four different conditions including different values of the height of the shoulder 4, when the space between the back end of the slider 1 and the disk 31 is fixed. In FIG. 4, the minimum flying height of the slider 1 is 50 nm, the pitch angle of the slider 1 is 100 ($\mu$rod, and marks □, ○, Δ and ▽ indicate values under conditions shown below.

| | Length L (mm) | Height of Shoulder ($\mu$m) |
|---|---|---|
| □ | 0.2 | 0.1 |
| ○ | 0.3 | 0.1 |
| Δ | 0.4 | 0.2 |
| ▽ | 0.4 | 0.3 |

As is obvious from FIG. 4, the hydrodynamic force acting on the slider 1 at a portion corresponding to an outer peripheral portion of the disk 31 is higher than that acting on the same at a position corresponding to an inner peripheral portion of the disk 31 in a region where the length ratio S/L, i.e., the ratio of the length S of the land 5 to the length L of the front dynamic pressure generating part 2a, is 50% or above. The positional hydrodynamic force difference is relatively small in a second region where the length ratio S/L is greater than 10% and smaller than 50%. The hydrodynamic force acting on the slider 1 at a portion corresponding to the outer peripheral portion of the disk 31 is lower than that acting on the same at a position corresponding to the inner peripheral portion of the disk 31 in a region where the length ratio S/L is 10% or below.

Figure 5:
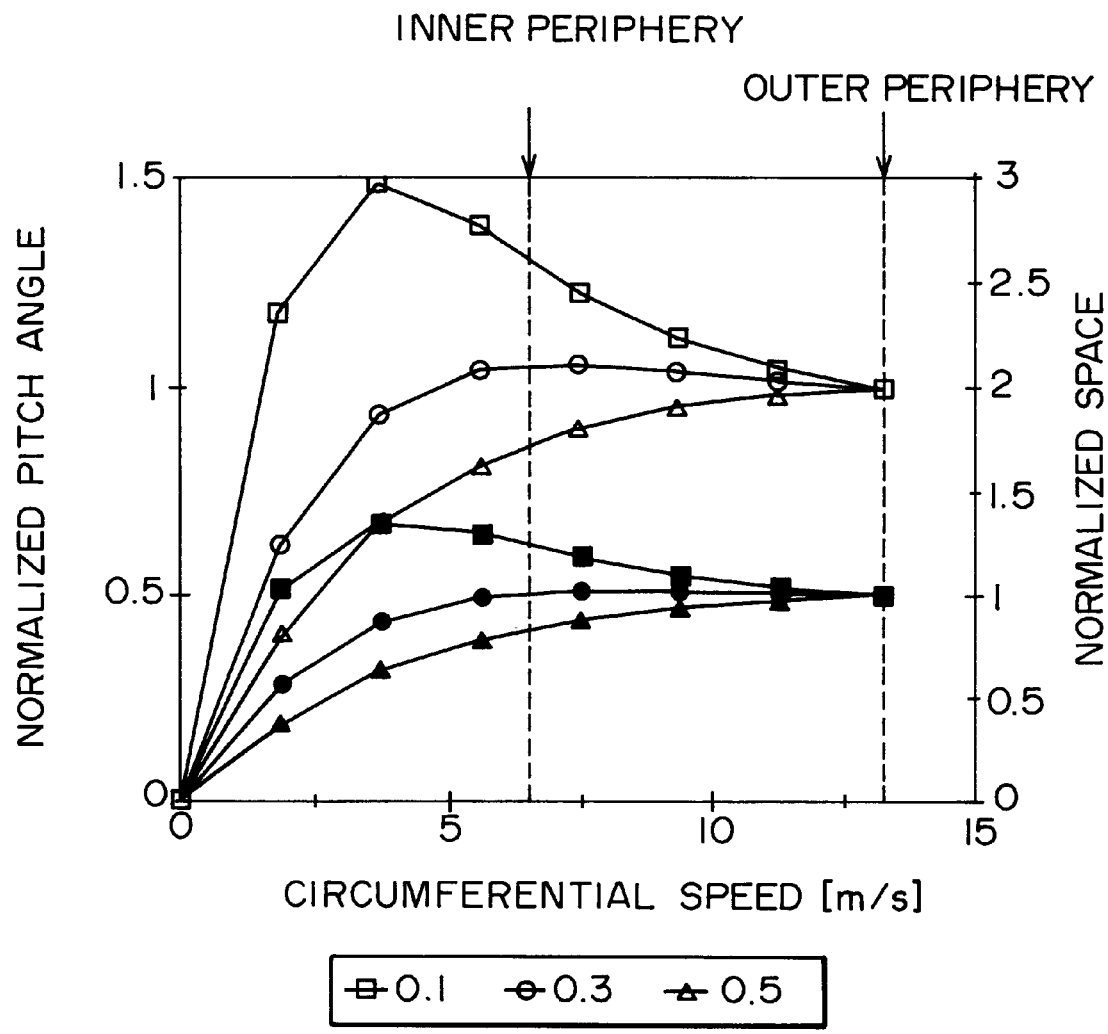
FIG. 5 is a graph showing the variation of the pitch angle of a slider, and the space between the back end of the slider part and the disk with a circumferential speed of the disk.

FIG. 5 is a graph showing the variation of the pitch angle of the slider 1, and the space between the back end of the tack dynamic pressure generating part 2b on which the read/write head 20 is held and the disk 31 with the circumferential speed of the disk 31, in which pitch angles normalized by the pitch angle of the slider 1 at a position corresponding to an outer peripheral portion of the disk 31, and the spaces normalized by the space between the back end of the back dynamic pressure generating part 2b and the disk 31 when the slider 31 is at a position corresponding to the outer peripheral portion of the disk 31 are measured on the vertical axes.

When the front dynamic pressure generating part 2a has a length ratio S/L of 50% in the first region, the pitch angle increases with the increase of the circumferential speed of the disk 31, i.e., with the movement of the slider 1 toward the outer periphery of the disk 31 (a curve indicated by Δ) and, consequently, the space increases (a curve indicated by ▲). Therefore, the flying height of the slider 1 cannot be kept constant regardless of the radial position of the slider 1 relative to the disk 31.

When the front dynamic pressure generating part 2a has a length ratio S/L of 10% in the third region, the pitch angle decreases with the increase of the circumferential speed of the disk 31, i.e., with the movement of the slider 1 toward the outer periphery of the disk 31 (a curve indicated by □) and, consequently, the space decreases (a curve indicated by ■). Therefore, the flying height of the slider 1 cannot be kept constant regardless of the radial position of the slider 1 relative to the disk 31.

When the front dynamic pressure generating part 2a has a length ratio S/L of 30% in the second region where the length ratio S/L is greater than 10% and smaller than 50%, the pitch angle (a curve indicated by ○) and the space (a curve indicated by ● remain substantially constant regardless of the circumferential speed of the disk 31. Therefore, the flying height of the slider 1 can be kept constant.

Thus, the flying height can be kept constant (provided that variations within ±10% are allowable) when the length of the land 5 formed in the dynamic pressure generating part 2a in the rotating direction A of the disk 31 is greater than 10% and smaller than 50% of the length of the dynamic pressure generating part 2a in the rotating direction A of the disk 31. The flying height can substantially perfectly be kept constant regardless of the radial position of the slider 31 relative to the disk 31 when the length of the land 5 is about 30% of the length of the dynamic pressure Generating part 2a.

It is generally known that the dynamic pressure generating efficiency of the so-called stepped land hydrodynamic bearing reaches a maximum when the length of the land 5 is about 30% of the length of the front dynamic pressure generating part 21. Accordingly, it is possible to keep the flying height constant regardless of the radial position of the slider relative to the disk and to generate sufficient dynamic pressure effectively by the slider having a limited working area.

Thus, the first embodiment suppresses the transient variation of flying height through the reduction of yaw angle dependence and achieves keeping flying height constant regardless of the radial position of the slider 1 relative to the disk 31.

Sometimes the disk 31 is stuck to the slider 1 with moisture condensed between the slider 1 and the disk 31 while the disk 31 is stopped and becomes unable to rotate. Generally a rough texture is given to the surface of the disk 31 by forming minute irregularities, not shown, therein so that small spaces are formed between the slider 1 and the disk 31 while the disk 31 is stopped to solve such a problem. However, the rough texture of the surface of the disk 31 has been an obstacle to the reduction of the flying height of the slider 1 because the rough texture enhances the danger of collision between the slider 1 and the disk 31 during operation when the flying height varies.

Figure 17:
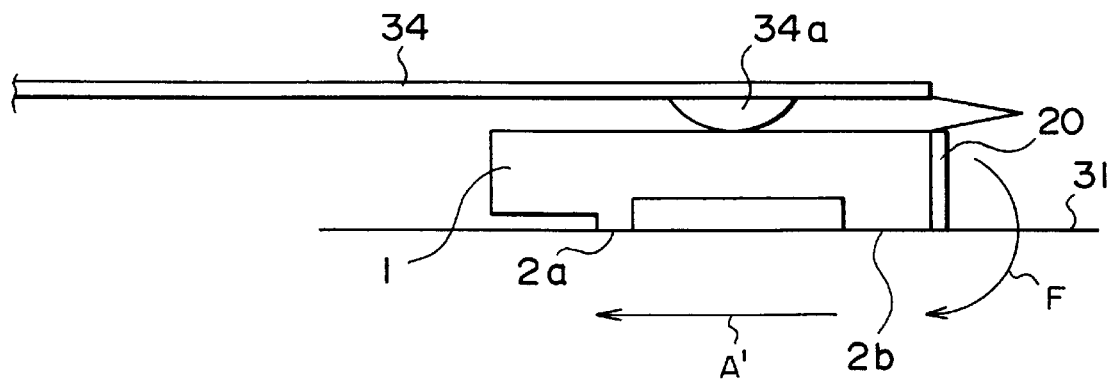
FIG. 17 is a schematic side view of a head slider, comparatively showing the respective areas of a front dynamic force generating part and a back dynamic force generating part.

When a spindle motor for driving the disk 31 is started, the disk 31 oscillates in opposite directions as it starts rotating and does not necessarily start rotating smoothly only in the predetermined rotating direction. Such a rotation starting mode of the disk 31 is shown in FIG. 17. The oscillatory motion of the disk 31 is attributable to the timing of excitation, and the positional relation between the magnetic poles and the coils of the spindle motor. At a moment the disk 31 starts moving in the opposite direction A', a moment M around the back end of the back dynamic pressure generating part 2b, which tends to turn the slider 1 supported by a gimbals 34a on the suspension arm 34 on the back end of the slider 1 in a direction to separate the front dynamic pressure generating part 2a from the disk 1, acts on the slider 1. The front dynamic pressure generating part 2a can easily be separated first from the disk 31 when the area of a surface of the front dynamic pressure generating part 2a in contact with the disk 31 is smaller than that of a surface of the back dynamic pressure generating part 2b in contact with the disk 31 and, consequently, the slider 1 can easily be tilted at a pitch angle and the slider 1 can be separated from the disk 31. Since the surface of the land 5 of the front dynamic pressure generating part 2a comes into contact with the disk 31 in this embodiment and the area of contact of the front dynamic pressure generating part 2a (the area of the surface of the land 5) is relatively small, the stacking of the slider 1 to the disk 31 can effectively be prevented.

Figure 6A:
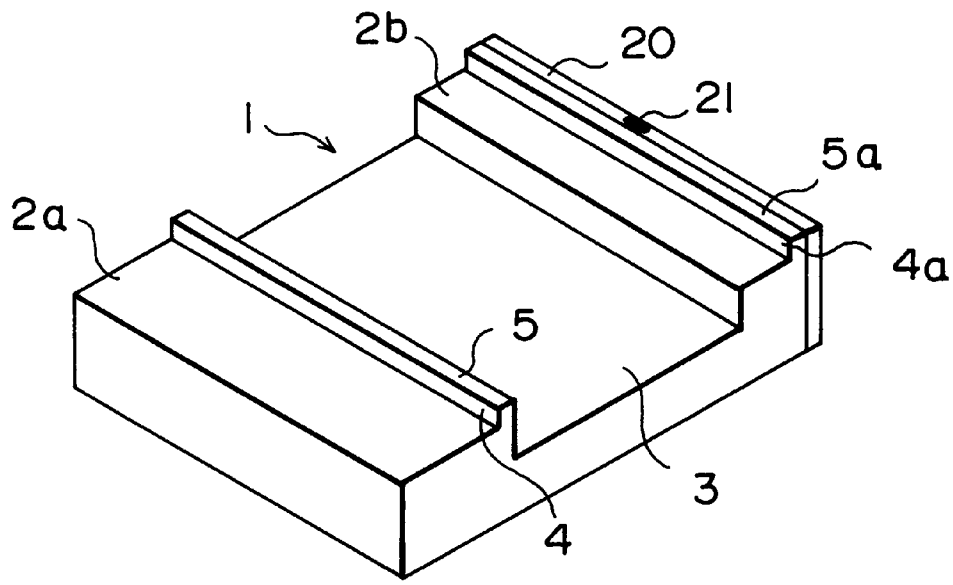
FIG. 6A is a perspective view of a modification of the head slider in the first embodiment according to the present invention.
Figure 6B:
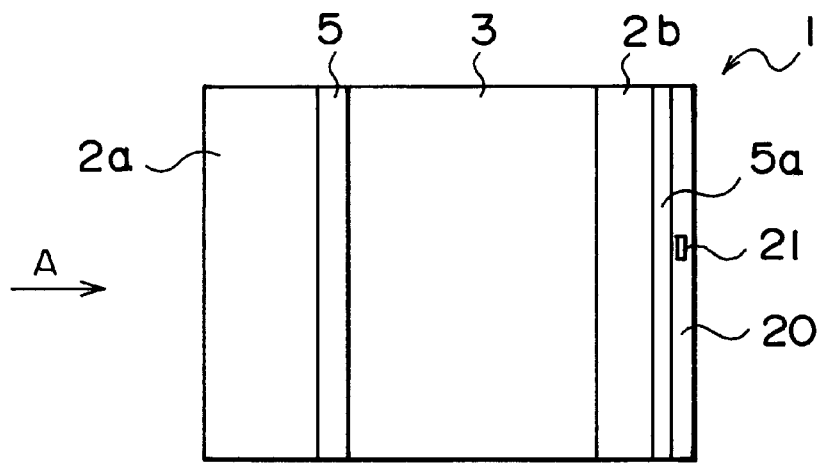
FIG. 6B is a plan view of the head slider of FIG. 6A.
Figure 6C:
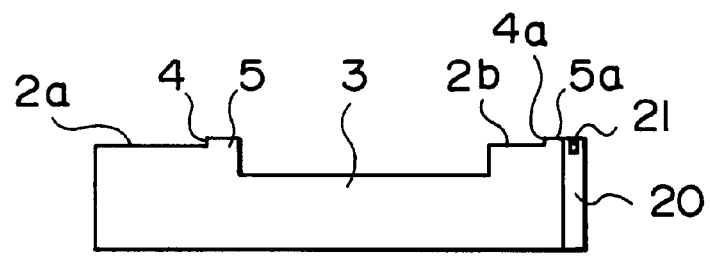
FIG. 6C is a side view of the head slider of FIG. 6A.

Although only the front dynamic pressure generating part 2a is provided with the land 5 having the shoulder 4 in this embodiment, the back dynamic pressure generating part 2b, as well as the front dynamic pressure generating part 2a, may be provided with a land 5a having a shoulder 4a as shown in FIGS. 6A to 6C for the same effect. When the back dynamic pressure generating part 2b is provided with the land 5a, the same hydrodynamic force acts on the back dynamic pressure generating part 2b. Therefore, the area of contact of the back dynamic pressure generating part 2b can be reduced and hence the slider 1 can be formed in a smaller size.

Second Embodiment

Figure 7A:
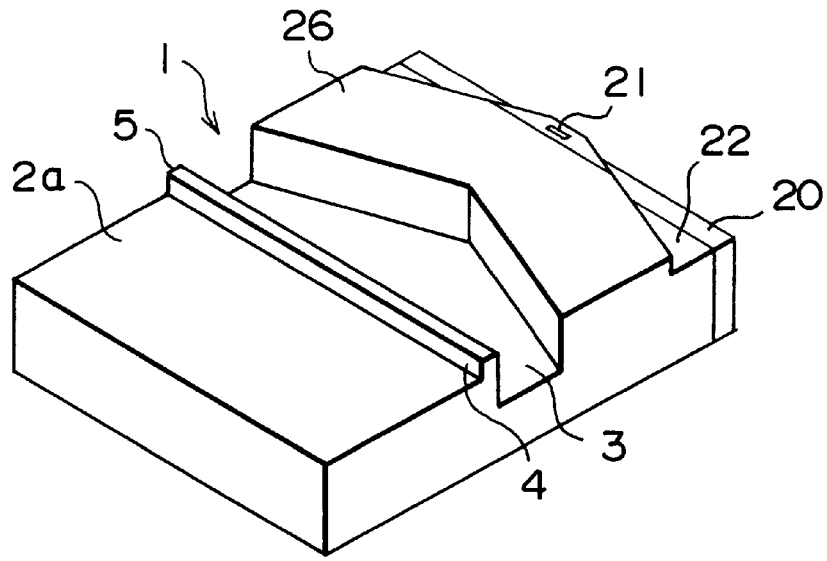
FIG. 7A is a perspective view of a head slider in a second embodiment according to the present invention.
Figure 7B:
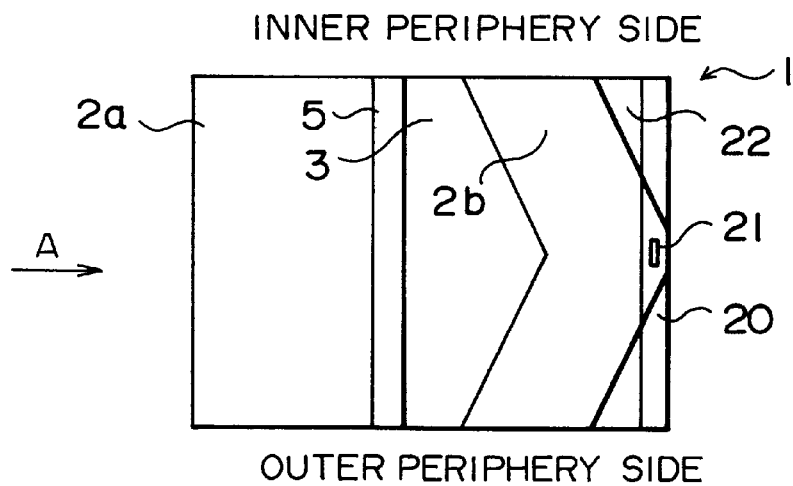
FIG. 7B is a plan view of the head slider of FIG. 7A.
Figure 7C:
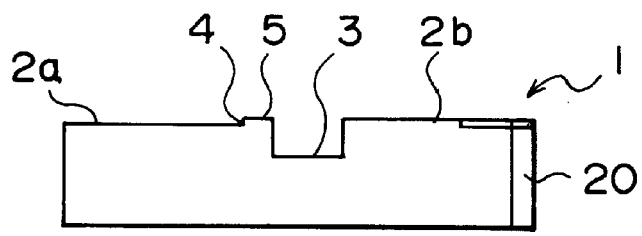
FIG. 7C is a side view of the head slider of FIG. 7A.

A slider 1 in a second embodiment according to the present invention will be described hereinafter with reference to FIGS. 7A to 7C. In the following description of the preferred embodiments, parts like or corresponding to those shown in FIGS. 2A to 2C are designated by the same reference characters and the description thereof will be omitted to avoid duplication. FIGS. 7A to 7C are a perspective view, a plan view and a side view, respectively, of the slider 1 in the second embodiment.

As shown in FIGS. 7A to 7C, the slider 1 has two dynamic pressure generating parts 2a and 2b arranged one behind the other in the rotating direction of the disk. The front dynamic pressure generating part 2a is provided with a land 5 having a shoulder 4 to reduce positional flying height difference, and the back dynamic pressure generating part 2b is formed in a shape substantially resembling the letter V opening toward the front (to the left as viewed in FIG. 7B), i.e., in a direction opposite the rotating direction A of the disk.

The slider 1 having, similarly to the slider 1 in the first embodiment, transversely elongate dynamic pressure generating parts 2a and 2b as shown in FIGS. 7A to 7C flies in a slant position slanting down from the side of the inner periphery toward the side of the outer periphery of the disk 31 when the slider 1 yaws at a position corresponding to the outer peripheral portion of the disk 31 because a dynamic pressure of air current generated by the rotating disk 31 acts on the slider 1 at a position on the side of the outer periphery of the disk 31 relative to its center. Sometimes the slider 1 is caused to roll by errors due to faulty disposition of a suspension arm, not shown, supporting the slider 1, irregularities in the surface of the disk 31 and the effect of external vibrations acting on the magnetic disk drive. Under these circumstances, there is the possibility that the lower corners of the back end of the slider 1 at the lowest flying height come into contact with the disk 31. Therefore, the both side portions of the back end of the back dynamic pressure generating part 2b are cut to form chambers 22. The back dynamic pressure generating part 2b is formed in a shape substantially resembling the letter V as beat shown in FIG. 7B so that side portions of the back dynamic pressure generating part 2b have a sufficiently large area to prevent the reduction of the rolling stiffness of the slider 1.

The slider in the second embodiment, similarly to that in the first embodiment, is capable of suppressing the transient variation of flying height through the reduction of yaw angle dependence and of keeping the flying height constant regardless of the position of the slider 1 relative to the disk 31. Since the chamfers 22 are formed in the both side portions of the back end of the back dynamic pressure generating part 2b, the side portions of the back dynamic pressure generating part 2b will not come into contact with the disk 31 even if the slider 1 rolls.

Figure 8A:
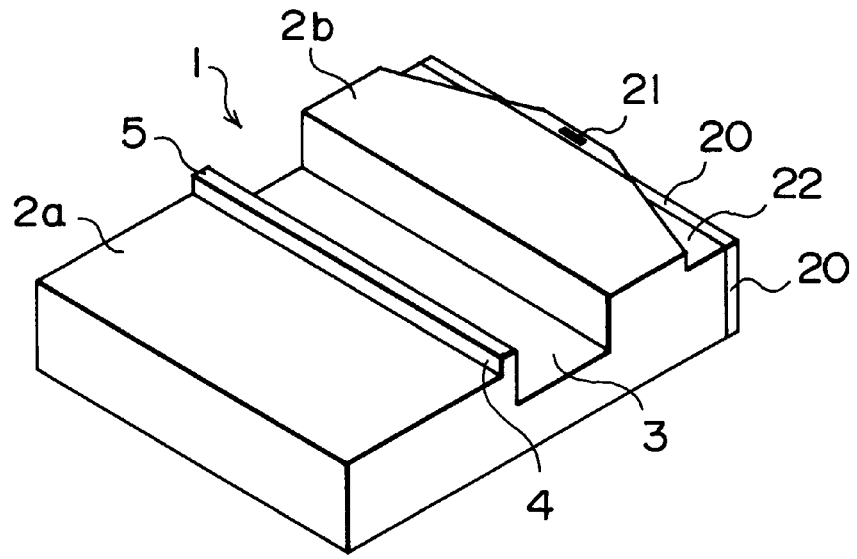
FIG. 8A is a perspective view of a modification of the head slider in the second embodiment according to the present invention.
Figure 8B:
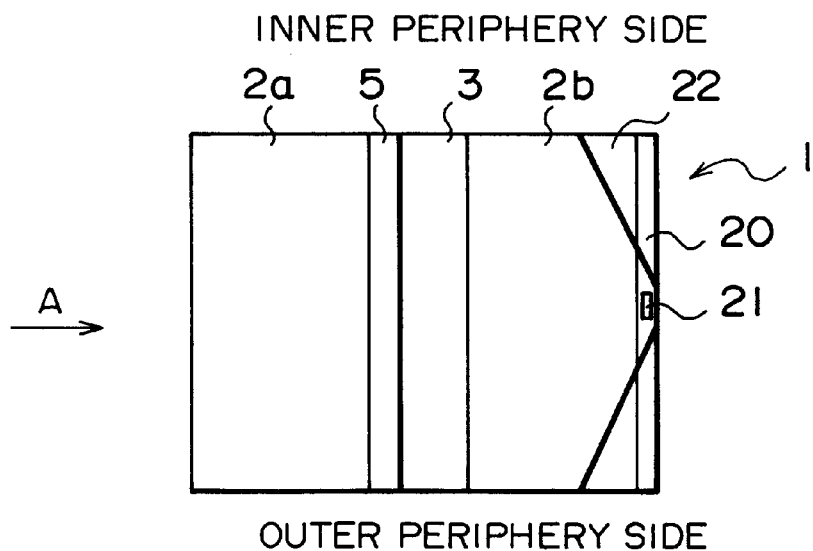
FIG. 8B is a plan view of the head slider of FIG. 8A.
Figure 8C:
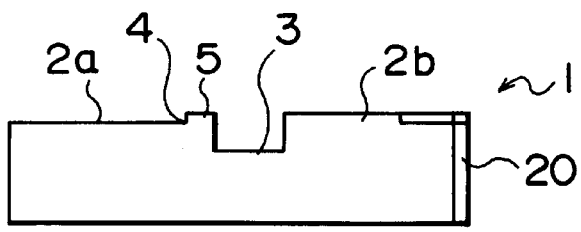
FIG. 8C is a side view of the head slider of FIG. 8A.

The back dynamic pressure generating part 2b need not necessarily be formed in the shape subtantially resembling the letter V; the back dynamic pressure generating part 2b may be formed in a shape having chamfers 22 formed by cutting the both side portions of only the back end thereof as shown in FIGS. 8A to 8C.

The height of the chamfers 22 may be equal to that of the shoulder 4 of the land 5 of the front dynamic pressure generating part 2a and may be formed simultaneously with the land 5 by one etching cycle, which improves manufacturing efficiency.

Third Embodiment

Figure 9A:
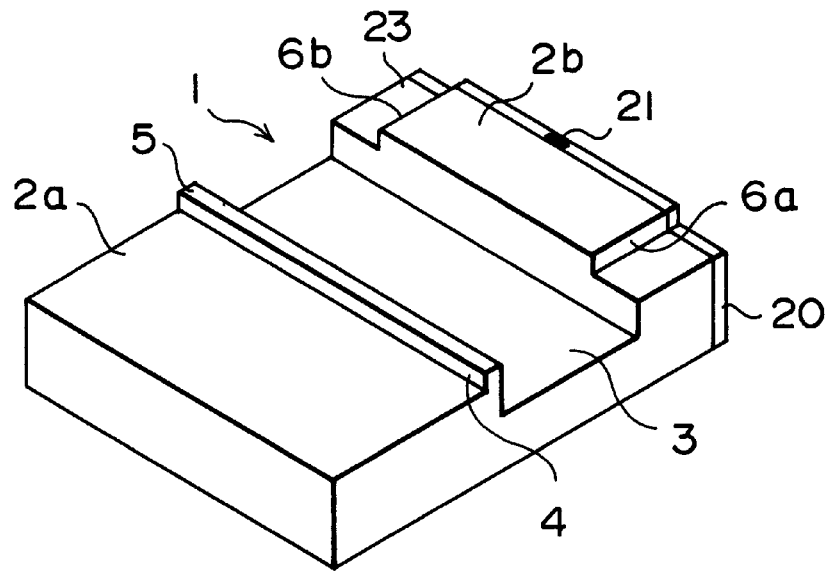
FIG. 9A is a perspective view of a head slider in a third embodiment according to the present invention.
Figure 9B:
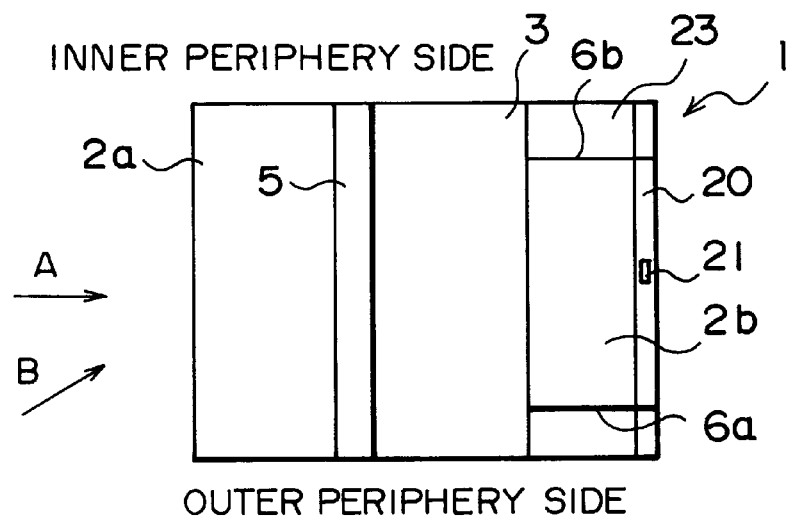
FIG. 9B is a plan view of the head slider of FIG. 9A.
Figure 9C:
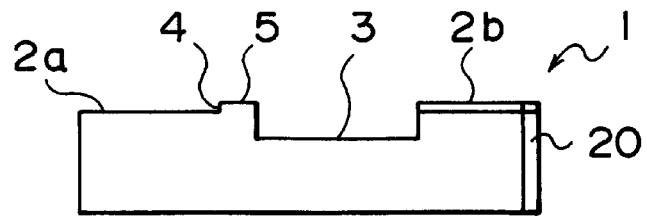
FIG. 9C is a side view of the head slider of FIG. 9A.

A slider 1 in a third embodiment according to the present invention will be described with reference to FIGS. 9A to 9C. FIGS. 9A, 9B and 9C are a perspective view, a plan view and a side view, respectively, of the slider 1. As mentioned above, the slider 1 having similarly to the slider 1 in the first embodiment, transversely elongate dynamic pressure generating parts 2a and 2b as shown in FIGS. 7A to 7C flies in a slant position slanting down from the side of the inner periphery toward the side of the outer periphery of the disk 31 when the slider 1 yaws at a position corresponding to the outer peripheral portion of the disk 31. In the third embodiment, the dynamic pressure generating parts 2a and 2b of the slider 1 are arranged one behind the other in the rotating direction A of the disk 31, a land 5 having a shoulder 4 is formed in the front dynamic pressure generating part 2a to reduce positional flying height difference, i.e., the difference between the flying height of the slider 1 at a position corresponding to the inner peripheral portion of the disk 31 and that of the same at a position corresponding to the outer peripheral portion of the disk 31. The both side portions of the back dynamic pressure generating part 2b are cut to form recesses 23. Thus, shoulders 6a and 6b extending in the rotating direction A of the disk 31 are formed.

Strictly speaking, there is a difference in the rotating direction A relative to the slider 1 between a position corresponding to the inner peripheral portion of the disk 31 and that corresponding to the outer peripheral portion of the disk 31. The difference in the rotating direction A corresponds to a difference in the yaw angle between those positions. In FIG. 9B, the rotating direction A of the disk 31 relative to the slider 1 at the position corresponding to the inner peripheral portion of the disk 31 is indicated by the arrow A, and that of the disk 31 relative to the slider 1 at the position corresponding to the outer peripheral portion of the disk 31 is indicated by the arrow B. When the slider 1 is at the position corresponding to the outer peripheral portion of the disk 31, the disk 31 rotates in the direction of the arrow B relative to the slider 1, a pressure tending to separate the slider 1 from the disk 31 (positive pressure) is generated around the shoulder 6a on the side of the outer periphery of the disk, and a pressure tending to attracting the slider 1 toward the disk 31 (negative pressure) is generated around the shoulder 6b on the side of the inner periphery of the disk 31. Consequently, the slider 1 tends to slant down from the side of the outer periphery toward the side of the inner periphery of the disk 31. Meanwhile, when the disk 31 rotates in the direction of the arrow B relative to the slider 1, the slider 1 yaws at a yaw angle and thereby the center of a dynamic pressure generated by air currents shifts toward the inner periphery of the disk 31. Consequently, the slider tends to slant down from the side of the inner periphery toward the side of the outer periphery of the disk 31. These forces acting in opposite directions, respectively on the slider 1 cancel each other, so that the rolling of the slider at a position corresponding to an outer peripheral portion of the disk 31 can be prevented.

The third embodiment, similarly to the first embodiment, is capable of suppressing the transient variation of flying height through the reduction of yaw angle dependence, of keeping the flying height constant regardless of the position of the slider 1 relative to the disk 31 and of preventing the rolling of the slider 1 at a position corresponding to an outer peripheral portion of the disk 31. Therefore, the back dynamic pressure generating part 2b will not come into contact with the disk 31.

Manufacturing efficiency can be improved by forming the shoulder 4 of the front dynamic pressure generating part 2a and the shoulders 6a and 6b simultaneously in the same height by a single etching cycle.

Fourth Embodiment

Figure 10A:
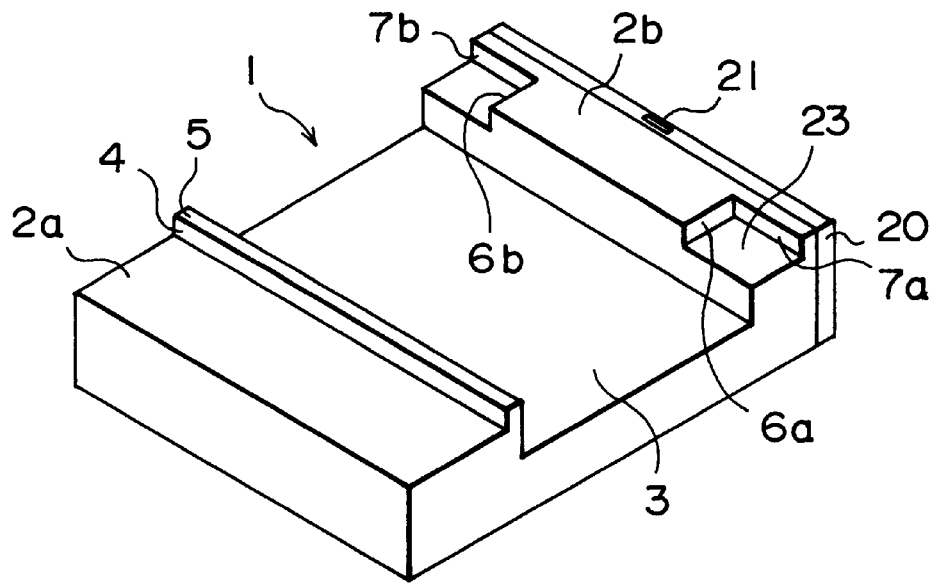
FIG. 10A is a perspective view of a head slider in a fourth embodiment according to the present invention.
Figure 10B:
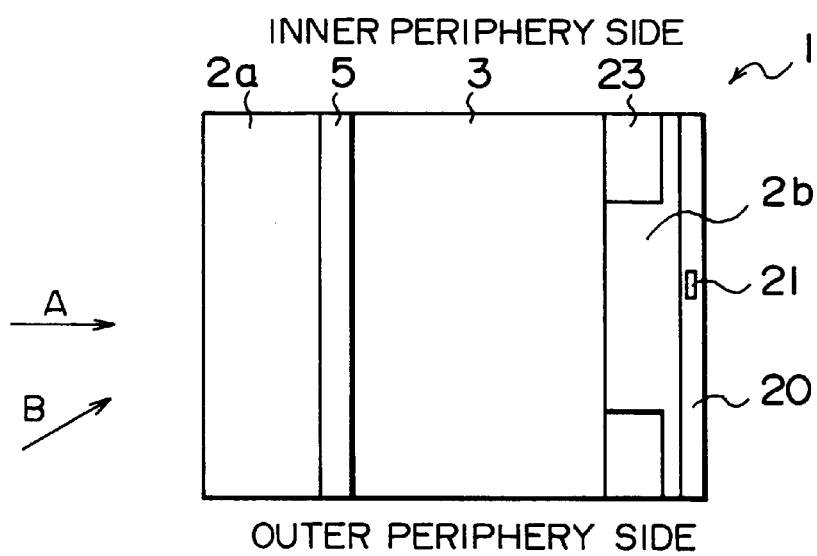
FIG. 10B is a plan view of the head slider of FIG. 10A.
Figure 10C:
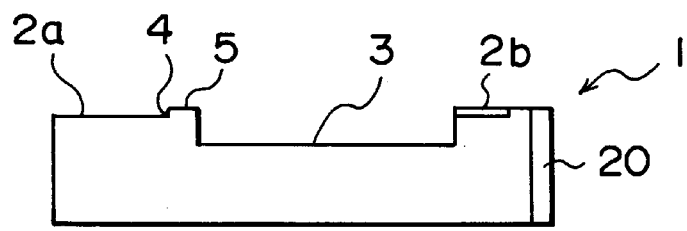
FIG. 10C is a side view of the head slider of FIG. 10A.

A slider 1 in a fourth embodiment according to the present invention will be described with reference to FIGS. 10A to 10C. FIGS. 10A, 10b and 10C are a perspective view, a plan view and a side view, respectively, of the slider 1.

Figure 18:
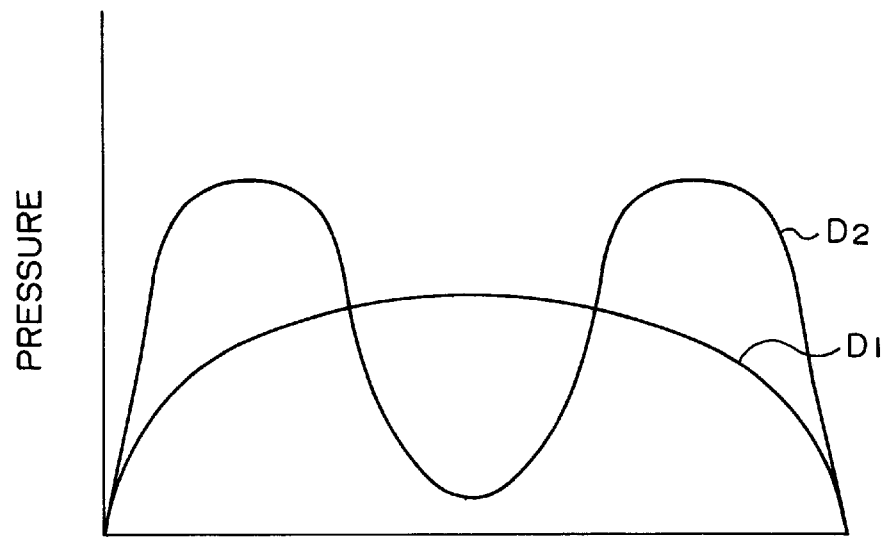
FIG. 18 is a graph showing a transverse pressure distribution on a back dynamic force generating part.
Figure 19:
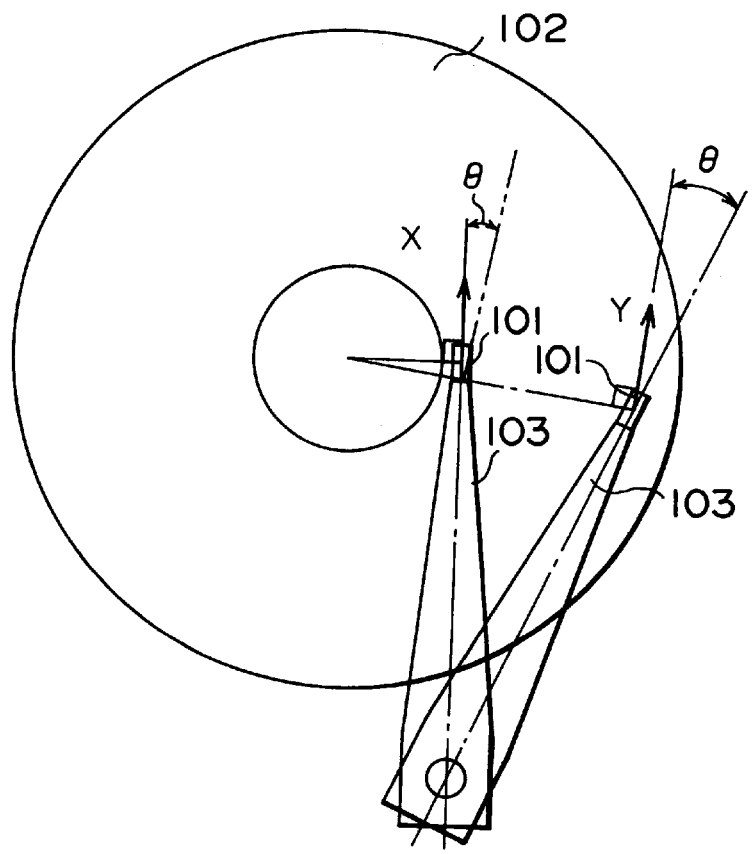
FIG. 19 is a schematic view of a magnetic disk drive employing a conventional head slider.
Figure 20:
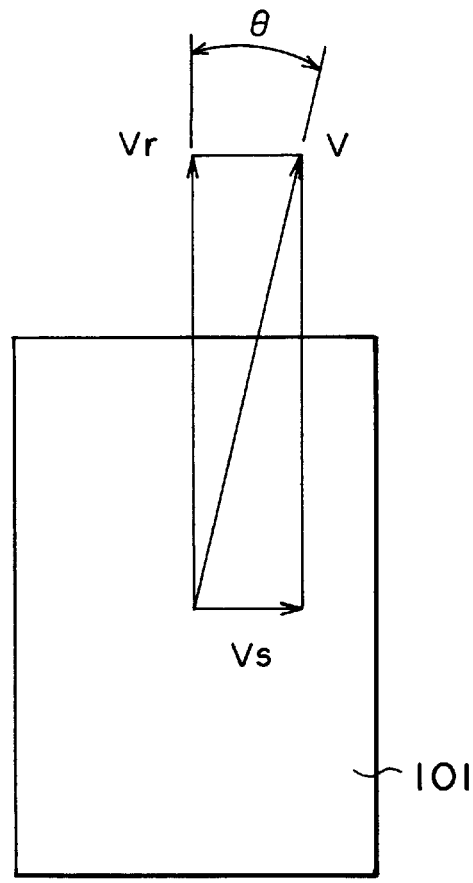
FIG. 20 is a diagrammatic view of assistance in explaining the change of equivalent yaw angle during a seek operation.
Figure 21:
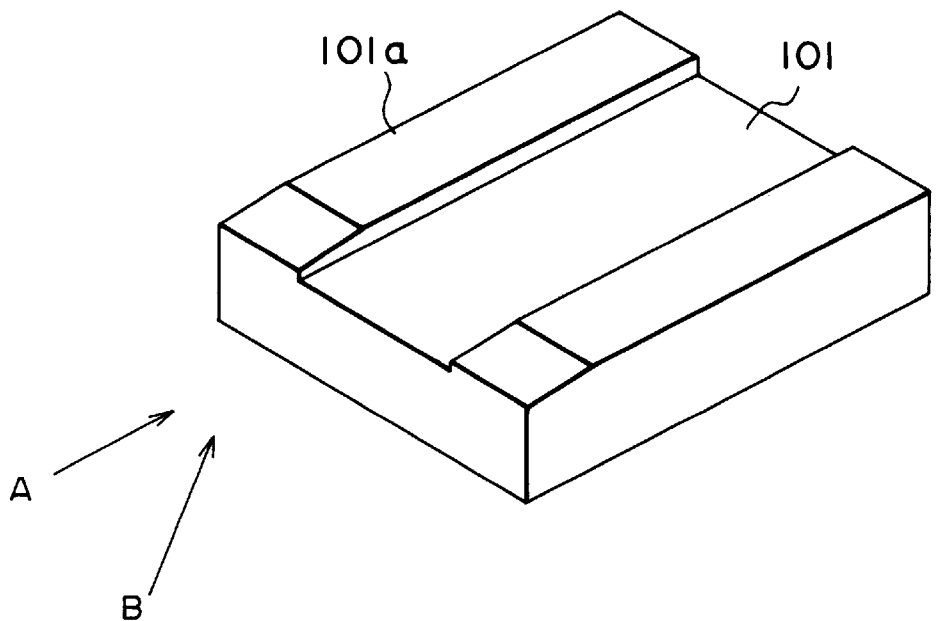
FIG. 21 is a perspective view of a conventional head slider.

Although the slider 1 in the third embodiment is capable of preventing rolling at a position corresponding to an outer peripheral portion of the disk 31, since the shoulders 6a and 6b are formed in the back dynamic pressure generating part 2b, dynamic pressure generated by the back dynamic pressure generating part 2b is reduced accordingly. Therefore, there is the possibility that the rolling stiffness of the slider 1 is reduced. In the fourth embodiment, recesses 23, shoulders 6a and 6b extending in the rotating direction A of a disk and shoulders 7a and 7b extending in a direction substantially perpendicular to the rotating direction A are formed by partially cutting the both side portions of a back dynamic pressure generating part 2b. The shoulders 6a and 6b exert the same effect as that of the shoulders 6a and 6b of the third embodiment, and the shoulders 7a and 7b generate a dynamic pressure (positive pressure). Therefore, a predetermined dynamic pressure can be secured around the back dynamic pressure generating part 2b, pressure distribution around the both side portions of the back dynamic pressure generating part 2b can be increased and the rolling stiffness of the slider 1 can be kept at a high level. Thus, the rolling stiffness of the slider 1 to maintain the slider in a correct position against a force tending to make the slider 1 roll about its longitudinal axis can be enhanced by increasing the pressure distribution around the both side portions of the back dynamic pressure generating part 2b. The rolling stiffness will be described in further detail. FIG. 18 shows a transverse pressure distribution, i.e., a pressure distribution in a direction (direction along the width of the slider 1) perpendicular to the rotating direction A of the disk 31. In a back dynamic pressure generating part 2b like those shown in FIGS. 2A to 2C and 6A to 6C having a uniform cross section, pressure is distributed in a pressure distribution curve $D_1$ having a maximum at a position corresponding to the middle of the width of the slider 1 and decreasing toward the opposite ends thereof where the pressure is approximately equal to the atmospheric pressure.

In the slider 1 having the back dynamic pressure generating part 2b provided with the shoulders 7a and 7b in the both side portions thereof as shown in FIGS. 10A to 10C, pressure is distributed in a pressure distribution curve D2 having local maximums at positions corresponding to the shoulders 7a and 7b, and a local minimum at a position corresponding to the middle of the width of the slider 1. Therefore, the rolling stiffness of the back dynamic pressure generating part 2b provided with the shoulders 7a and 7b is higher than that of the back dynamic pressure generating part 2b not provided with any portion corresponding to the shoulders 7a and 7b, even if the same hydrodynamic force acts those back dynamic pressure generating parts 2b.

Since the back dynamic pressure generating part 2b provided with the shoulders 7a and 7b is capable of generating a dynamic pressure higher than that can be generated by the back dynamic pressure generating part 2b having a flat surface of the slider 1 in the first embodiment, the length, i.e., a dimension in the rotating direction A, of the back dynamic pressure generating part 2b of the slider 1 in the fourth embodiment may be relatively short.

In addition, the contact area of the back dynamic pressure generating part 2b with the disk 31 during the stoppage of the disk 31 can be reduce and therefore the stacking of the slider 1 to the disk 31 can effectively be prevented.

The fourth embodiment, similarly to the third embodiment, is capable of suppressing the transient variation of flying height through the reduction of yaw angle dependence, of keeping the flying height constant regardless of the position of the slider 1 relative to the disk 31 and of preventing the rolling of the slider 1 at a position corresponding to an outer peripheral portion of the disk 31. Therefore, the back dynamic pressure generating part 2b will not come into contact with the disk 31.

Manufacturing efficiency can be improved by forming the shoulder 4 of a front dynamic pressure generating part 2a and the shoulders 6a, 6b, 7a and 7b simultaneously in the same height by a single etching cycle.

Fifth Embodiment

Figure 11A:
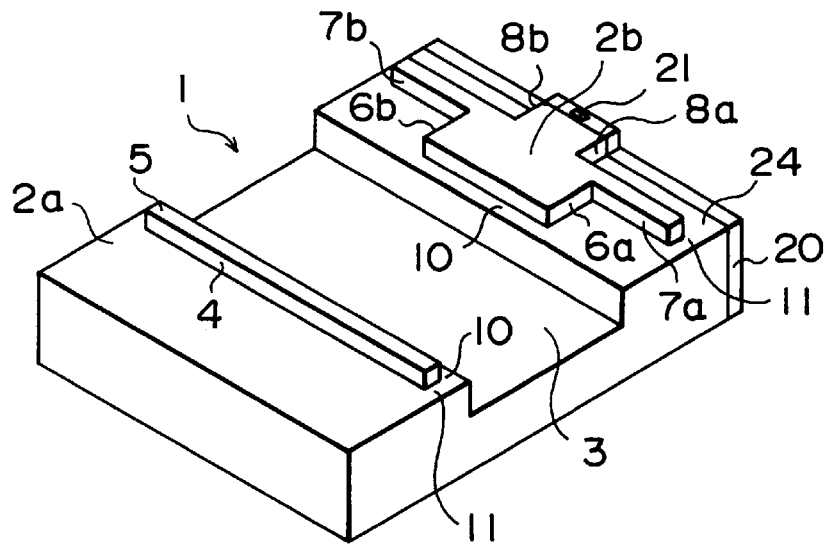
FIG. 11A is a perspective view of a head slider in a fifth embodiment according to the present invention.
Figure 11B:
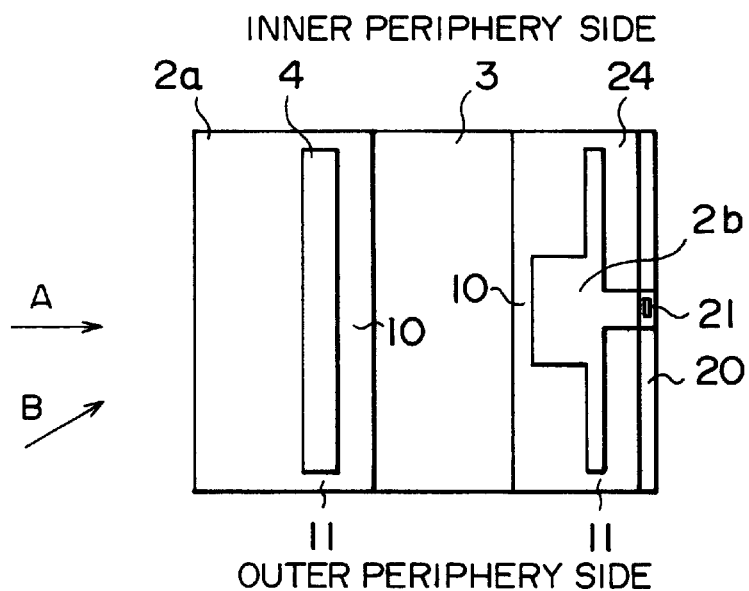
FIG. 11B is a plan view of the head slider of FIG. 11A.
Figure 11C:
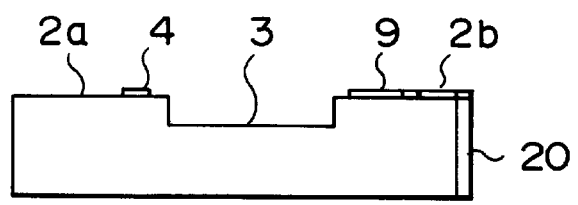
FIG. 11C is a side view of the head slider of FIG. 11A.

A slider 1 in a fifth embodiment according to the present invention will be described with reference to FIGS. 11A to 11C. FIGS. 11A, 11b and 11C are a perspective view, a plan view and a side view, respectively, of the slider 1. The slider 1 has a back dynamic pressure generating part 2b provided, in addition to shoulders 6a, 6b, 7a and 7b corresponding to those of the fourth embodiment, with recesses 24 and shoulders 8a and 8b formed by partially cutting the both side portions thereof to prevent the both side portions of the back dynamic pressure generating part 2b which is approaches closest to the disk may not come into contact with a disk 31 when the slider 1 is caused to roll by errors due to faulty disposition of the suspension arm 34 supporting the slider 1, irregularities in the surface of the disk 31 and the effect of external vibrations acting on the magnetic disk drive. The shoulders 8a and 8b are formed to prevent the reduction of the effect of the shoulders 6a and 6b formed in the both side portions of the back dynamic pressure generating part 2b. There is no possibility that the back end of the slider 1 comes into contact with the disk 31 even if the slider 1 is forced to roll.

In the fifth embodiment, marginal portions 10 are secured on the opposite longitudinal sides of a deep groove 3 formed between a land 5 and the back dynamic pressure generating part 2b so that the dimensions of a land 5 formed in a front dynamic pressure generating part 2a on the front side of the groove 3, and the back dynamic pressure generating part 2b on the back side of the groove 3 may not be changed, and any defects, such as chipped portions, may not be formed in the edges of the same when forming the deep groove 3 after forming the shoulders. The length of the front dynamic pressure generating part 2a in the rotating direction A does not include the length of the marginal portion 10 in the rotating direction A. Dimensional errors in forming the grooves 3 are attributable mostly to errors in the thickness of the blade for forming the groove 3 and in positioning the blade relative to the slider. The effect of dimensional errors in the back dynamic pressure generating part 2b on the variation of the flying height is insignificant. Therefore, the errors in positioning the blade are allowable and hence the slider may be provided with only the marginal portion 10 around the front dynamic pressure generating part 2a when the blade is positioned with reference to the front edge of the back dynamic pressure generating part 2b (FIGS. 22a–22c). Usually, a plurality of sliders are fabricated in a transversely contiguous arrangement in a single bar and the bar is cut into the plurality of separate sliders. Therefore, the slider 1 in the fifth embodiment is provided with marginal portions 11 near the both side portions of the land 5 or the dynamic pressure generating part 2b so that any defects, such as chipped portions, may not be formed in the edges of the land 5 and the dynamic pressure generating part 2b when cutting out the slider 1 from the bar in which a plurality of sliders are formed.

Sixth Embodiment

A sixth embodiment of the present invention will be described with reference to FIGS. 12A to 12C and 13A to 13C.

Figure 12A:
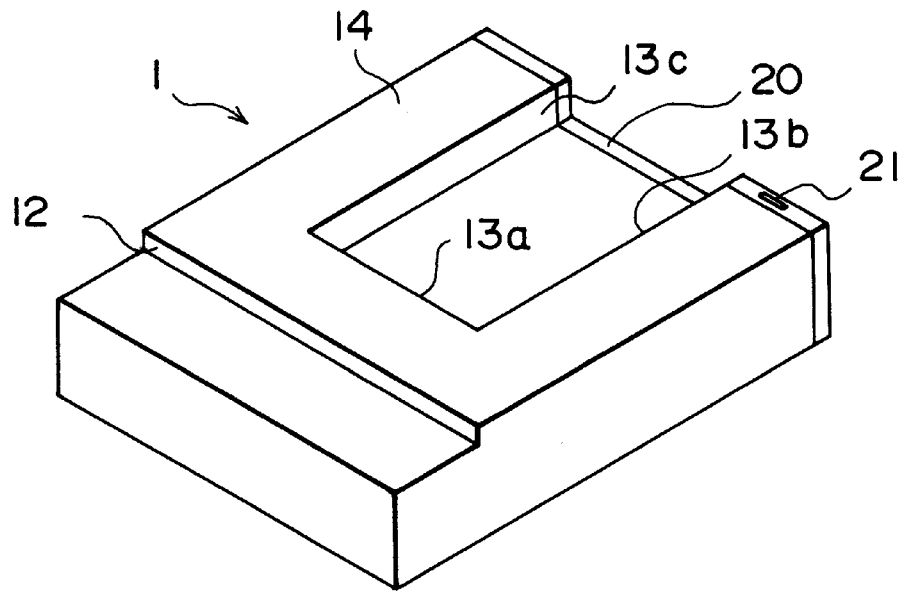
FIG. 12A is a perspective view of a head slider in a sixth embodiment according to the present invention.
Figure 12B:
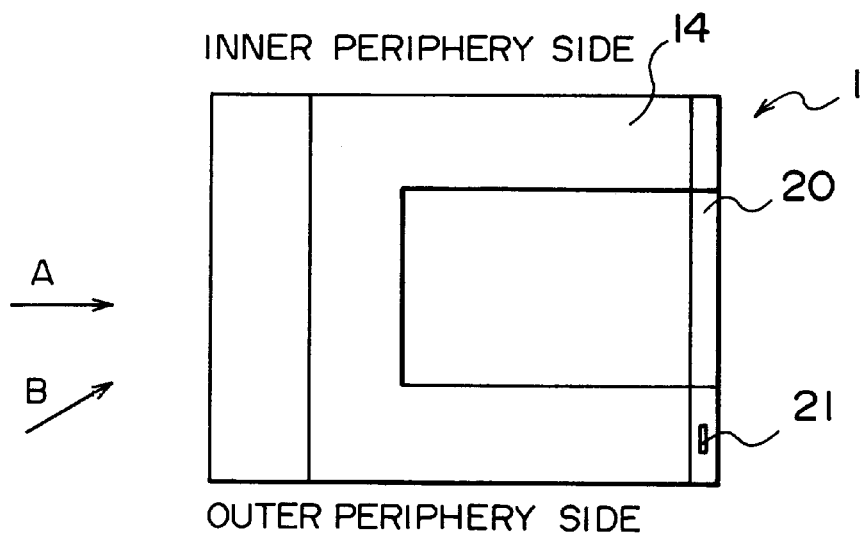
FIG. 12B is a plan view of the head slider of FIG. 12A.
Figure 12C:
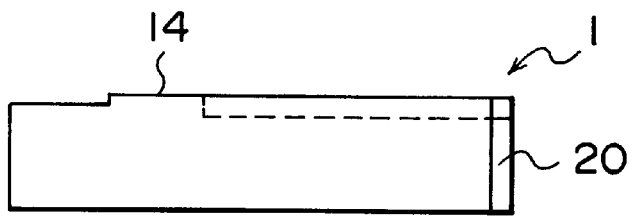
FIG. 12C is a side view of the head slider of FIG. 12A.
Figure 13A:
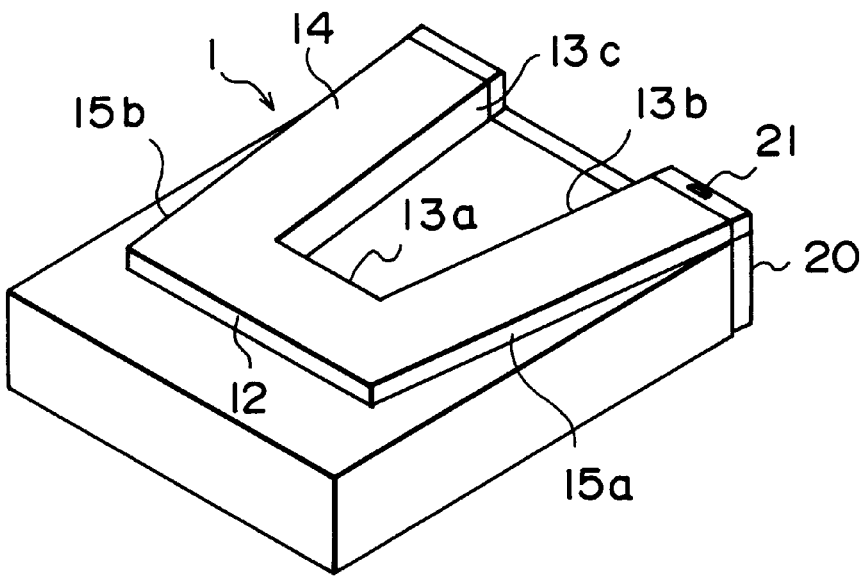
FIG. 13A is a perspective view of a head slider.
Figure 13B:
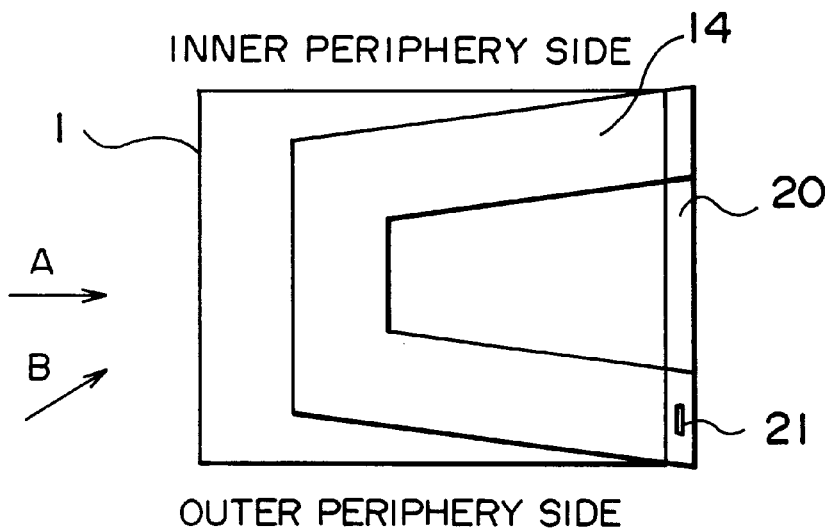
FIG. 13B is a plan view of the head slider of FIG. 13A.
Figure 13C:
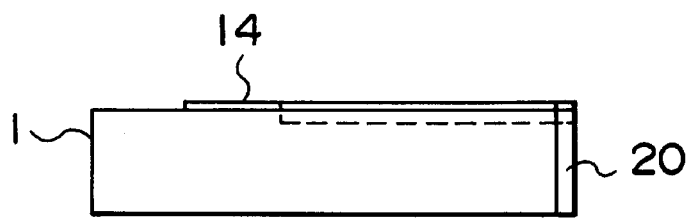
FIG. 13C is a side view of the head slider of FIG. 13A.

Referring to FIGS. 12A to 12C, a negative-pressure slider 1 has, on its surface to be faced toward a disk 31, a substantially U-shaped land 14 opening in a hind direction with respect to the rotating direction A of the disk 31 (to the right as viewed in FIGS. 12B). The land 14 has a shoulder 12 for generating a positive pressure in its front portion (left end portion as viewed in FIG. 12B), and a shoulder 13a for generating a negative pressure in its back portion. The slider 1 is kept in a predetermined flying position by the positive pressure generated by the shoulder 12 and the negative pressure generated by the shoulder 13a. The land 14 is formed in a shape substantially resembling the letter U to secure a predetermined hydrodynamic force for flying and to secure antirolling capability. The proportion of the positive pressure to the negative pressure remains constant regardless of the circumferential speed of the disk 31 and hence the flying height of the slider 1 can be kept constant. The shoulder 12 of the land 14 generates a relatively high positive pressure and the shoulder 13a generates a relatively high negative pressure proportional to the positive pressure and a flying height is determined when the slider 1 is at a position corresponding to an outer peripheral portion of the disk 31. The shoulder 12 of the land 14 generates a relatively low positive pressure and the shoulder 13a generates a relatively low negative pressure proportional to the positive pressure and a flying height is determined when the slider 1 is at a position corresponding to an inner peripheral portion of the disk 31. Thus, the proportion of the positive pressure to the negative pressure remains constant regardless of the radial position of the slider 1 relative to the disk 31. In the negative-pressure slider 1 shown in FIGS. 12A to 12C, sections 13b and 13c extending substantially in the rotating direction A of the disk 31 of the shoulder 13a for generating a negative pressure of the land 14 generate a negative pressure and a positive pressure, respectively. Consequently, it is possible that the slider 1 flies in a position exceedingly slanting down from the inner periphery toward the outer periphery of the disk 31. Therefore, a slider 1 in a modification of the slider 1 shown in FIGS. 12A to 12C, has a land 14 having both side sections having shoulders 15a and 15b extending substantially in the rotating direction A of the disk 31 as shown in FIGS. 13A to 13C. The shoulders 15a and 15b, similarly to the shoulders 6a and 5b of the slider 1 in the third embodiment, generate a positive pressure tending to slant down the slider 1 from the outer periphery toward the inner periphery of the disk 31. Such a function of the shoulders 15a and 15b and the foregoing function of the shoulders 13b and 13c cancel each other, so that the slider 1 is prevented from rolling when the same is at a position corresponding to an outer peripheral portion of the disk 31.

In this modification, the land 14 is formed so that the side sections there of diverge gradually in opposite directions, respectively, from the rotating direction A to enhance the rolling stiffness of the back portion of the slider 1 by increasing pressure distribution at the opposite sides of the slider 1.

Manufacturing efficiency can be improved by forming the shoulders 12, 15a and 15b of the land 14 simultaneously in the same height by a single etching cycle.

Seventh Embodiment

Figure 14A:
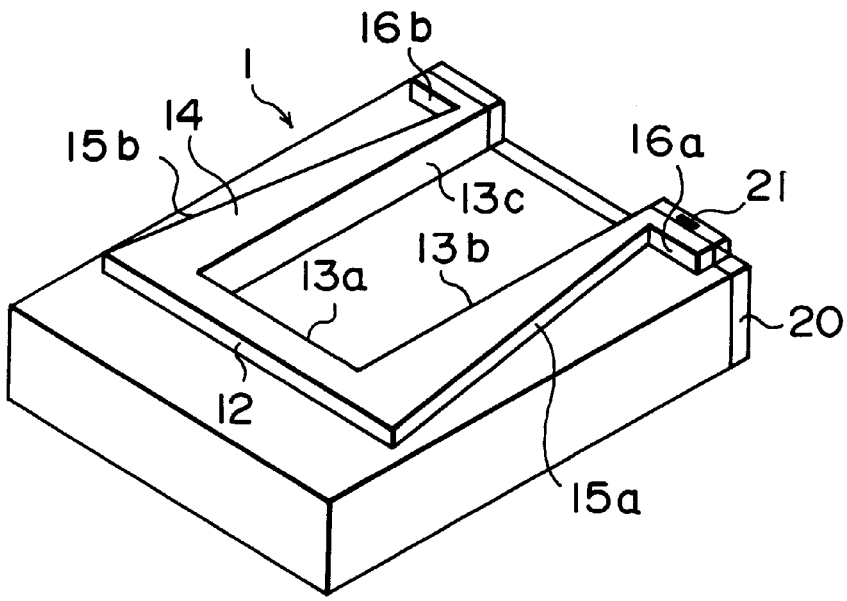
FIG. 14A is a perspective view of a head slider in a seventh embodiment according to the present invention.
Figure 14B:
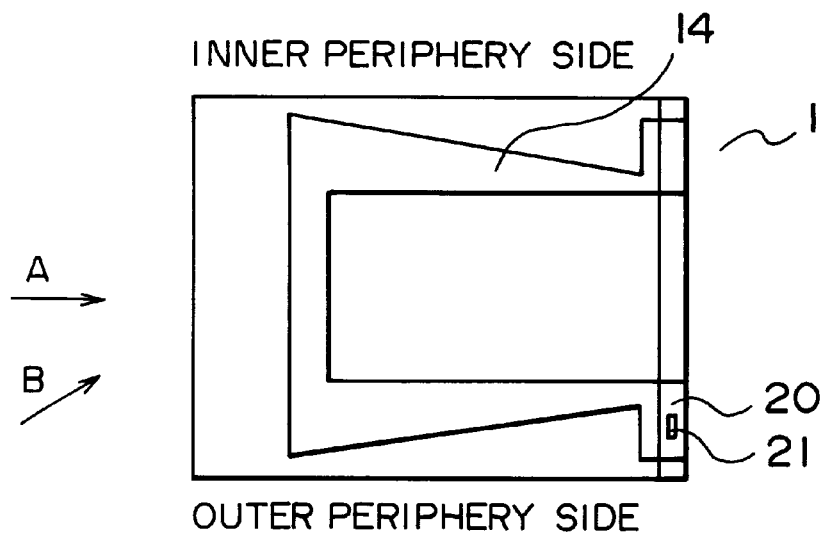
FIG. 14B is a plan view of the head slider of FIG. 14A.
Figure 14C:
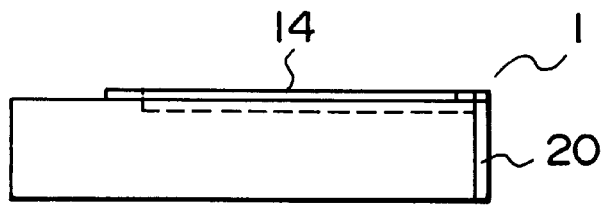
FIG. 14C is a side view of the head slider of FIG. 14A.

A negative-pressure slider 1 in a seventh embodiment according to the present invention will be described with reference to FIGS. 14A to 14C. The negative-pressure slider 1 in the seventh embodiment is based on a technical idea similar to that on which the slider 1 in the fourth embodiment is based. The slider 1 has a land 14 having both side sections having shoulders 15a and 15b extending substantially in the rotating direction of the disk 31, and back end sections having shoulders 16a and 16b extending in a direction substantially perpendicular to the rotating direction A. The slider 1 thus formed exerts the same effect as that exerted by the slider in the sixth embodiment and, since the shoulders 16a and 16b generate a positive pressure, a predetermined dynamic pressure can be secured around the back end of the slider 1, pressure distribution around the opposite sides of the slider can be increased, and hence the slider 1 is able to secure a high antirolling capability.

Manufacturing efficiency can be improved by forming the shoulders 12, 15a, 15b, 16a and 16b of the land 14 simultaneously in the same height by a single etching cycle.

Eighth Embodiment

Figure 15A:
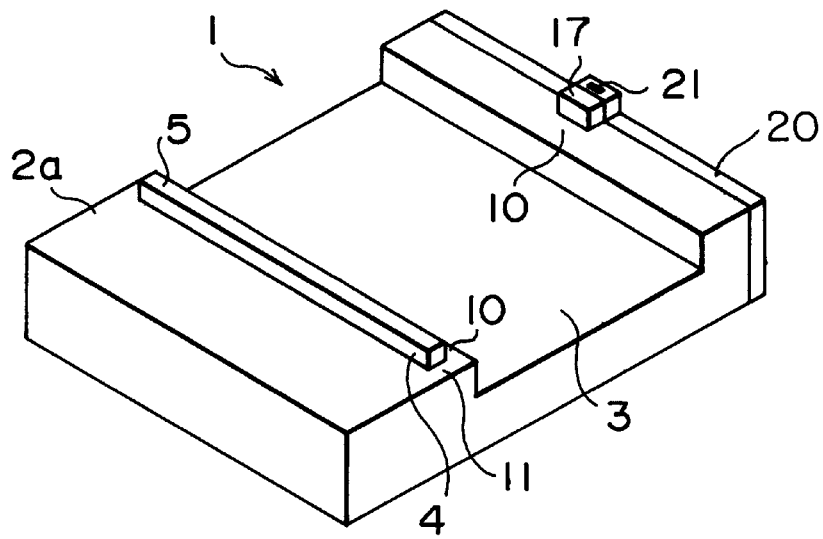
FIG. 15A is a perspective view of a head slider in an eighth embodiment according to the present invention.
Figure 15B:
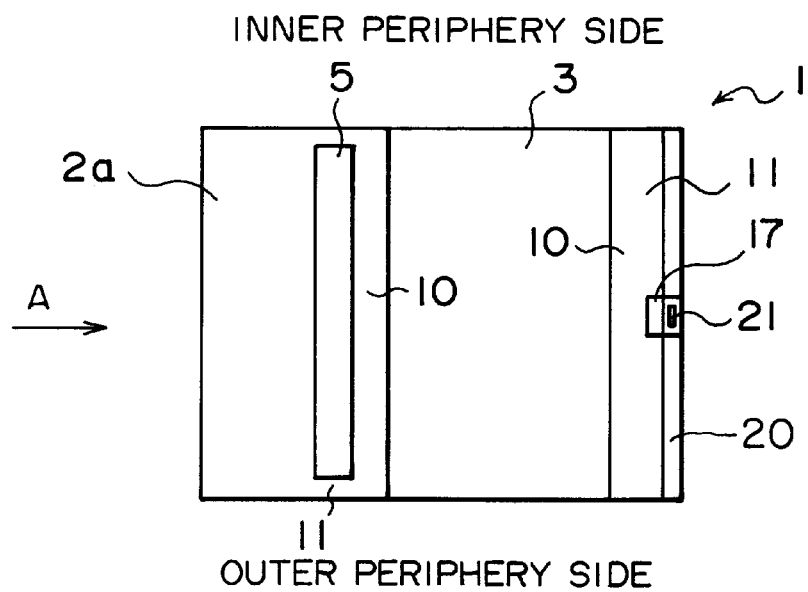
FIG. 15B is a plan view of the head slider of FIG. 15A.
Figure 15C:
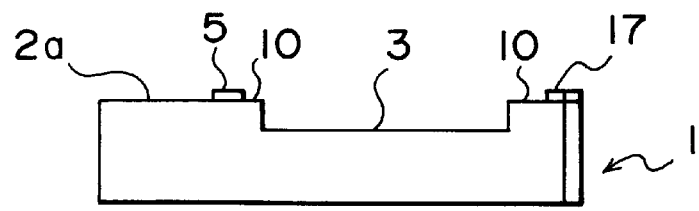
FIG. 15C is a side view of the head slider of FIG. 15A.

A slider 1 in an eighth embodiment according to the present invention will be described with reference to FIGS. 15A to 15C. The slider 1 in the eighth embodiment is similar in shape to that in the first embodiment, but the former is intended for contact recording. When used for contact recording, a slider must be designed so that any substantial hydrodynamic force may not be generated around a portion to come into contact with a disk. Therefore, the slider 1 does not have any dynamic pressure generating part corresponding to the back dynamic pressure generating part 2b of the slider 1 in the first embodiment. The slider in the eighth embodiment has on its surface facing the disk 31 a front dynamic pressure generating part 2a, and a pad 17 and disposed behind the front dynamic pressure generating part 2a. The pad 17 is in contact with the disk 31 during operation. This slider 1 is capable of reducing yaw angle dependence to suppress the transient variation of flying height and of maintaining a constant contact force, i.e., maintaining the pad 17 in a stable state of contact, regardless of the radial position thereof relative to the disk 31. Therefore, these contact force variation can be kept at a low level, and hence the pad 17 can be kept in contact with the disk 31 by the least possible force. When used for contact recording, the slider 1 need not have any pitching stiffness; a stable contact force for keeping the slider 1 in contact with the disk 31 can be maintained by properly determining the point of action of hydrodynamic force on the front dynamic pressure generating part 2a, the point of action of contact force on the pad 17 and the point of action of pressure on the slider 1 (Japanese Patent Application No. 6-276912). Since the pitching of slider 1 is substantially constant relative to the disk 31, there is no possibility that the pad 17 is separated from the disk 31 even if the head 21 is abraded considerably.

The pad 17 is formed by forming a land of a very short length in the rotating direction A of the disk 31 similar to the back dynamic pressure generating part 2b of the slider 1 in the first embodiment, and etching the surface of the land with a portion of the surface corresponding to the pad 17 masked. Manufacturing efficiency can be improved by forming the surface of the pad 17 flush with that of the land 5 of the front dynamic pressure generating part 2a, and simultaneously forming the pad 17 and the land 5 by a single etching cycle.

Incidentally, the back dynamic pressure generating part 2b is provided only for forming the pad 17, and therefore the length of the part 2b in the rotating direction of the disk can be small. As a result, the back dynamic pressure generating part 2b generates little pressure.

Figure 25A:
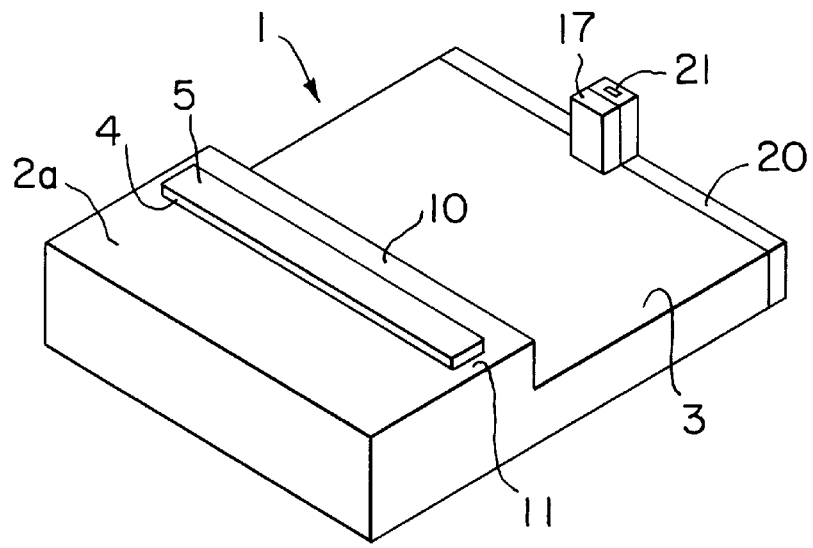
FIG. 25A is a perspective view of another head slider in the eighth embodiment according to the present invention.
Figure 25B:
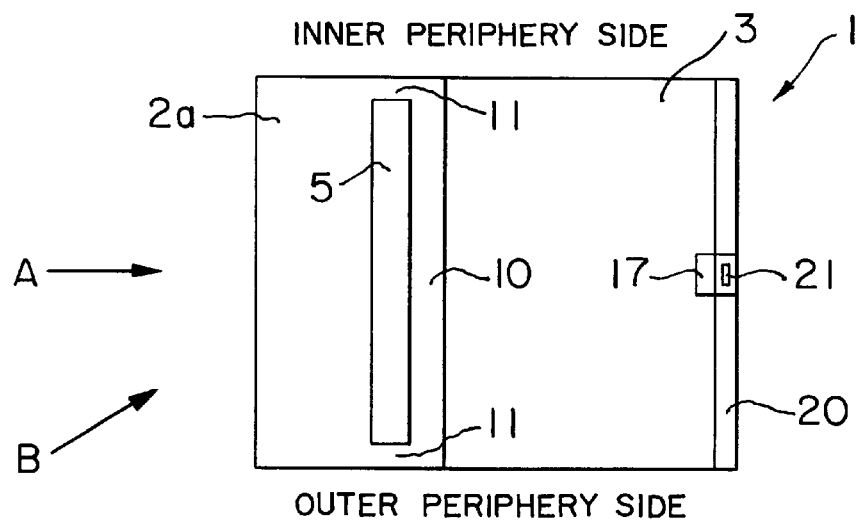
FIG. 25B is a plan view of the head slider of FIG. 25A.
Figure 25C:
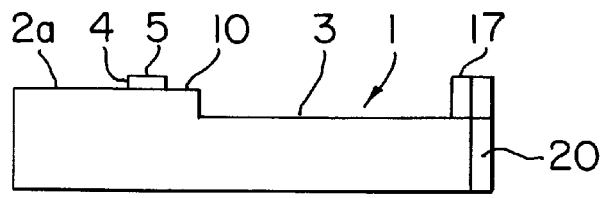
FIG. 25C is a side view of the had slider of FIG. 25A.

As shown in FIGS. 25A–25C, the back dynamic pressure generating part 2b can be omitted by masking a portion corresponding the pad 17 and then etching other portions except for the portion of the pad 17 to the same depth as the deep groove 3.

The slider 1 in the eighth embodiment, similarly to the slider 1 in the fifth embodiment, is provided with marginal portions 10 around the front dynamic pressure generating part 2a, the pad 17 and a deep groove 3 so that any defects, such as chipped portions, may not be formed in the edges of the front dynamic pressure generating part 2a and the pad 17 when cutting the deep groove 3 in the slider 1.

Dimensional errors in forming the groove 3 are attributable mostly to errors in the thickness of the blade for forming the groove 3 and in positioning the blade relative to the slider. Since the pad 17 is affected scarcely by the dimensional errors, the errors in positioning the blade are allowable and the slider may be provided with only the marginal portion 10 around the front dynamic pressure generating part 2a when the blade is positioned with reference to the front edge of the pad 17 (FIGS. 23A–22C).

Margins 11 are formed on the opposite sides of the front dynamic pressure generating part 2a so that any defects, such as chipped parts, may not be formed in the land 5 when cutting out the slider 1 from a plate in which a plurality of sliders are formed.

Ninth Embodiment

A slider in a ninth embodiment according to the present invention will be described with reference to FIGS. 24A to 24C. The slider in the ninth embodiment is a modification of the slider in the fifth embodiment.

In the slider in the fifth embodiment, the space between the head and the disk can be adjsuted to a desired value by properly determining the width, i.e., length in a direction substantially perpendicular to the rotating direction A of the disk, of the positive pressure generating shoulders 7a and 7b formed in the both side portions of the back dynamic pressure generating part 2b. The space is small when the width of the shoulders 7a and 7b is small and vice versa.

However, the respective positions of the shoulders 6a and 6b substantially in the direction of the rotating direction A of the disk change necessarily when the width of the shoulders 7a and 7b is changed. The antirolling effect of the shoulders 6a and 6b at such positions (fourth embodiment) is excessively high, and the slider is tilted down toward the inner periphery of the disk when the slider is at a position corresponding to the outer peripheral portion of the disk where the yaw angle of the slider is relatively large.

A slider in the ninth embodiment has a front dynamic pressure generating pert 2a provided with a substantially V-shaped land 5 opening in the rotating direction of the disk to solve Such a problem. When the slider yaws at a yaw angle at a position corresponding to an outer peripheral portion of the disk, a portion of the land 5 on the side of the outer periphery of the disk extends substantially perpendicularly to the rotating direction B of the disk and hence the distance of flow of air currents across the land 5 is short and air currents leave the land 5 before the dynamic pressure increase enough, whereas a portion of the land 5 on the side of the inner periphery of the disk is incliend to the rotating direction B of the disk and hence the distance of flow of air currents acorss the land 5 is long and a high dynamic pressure is generated. Consequently, a moment of force tending to tilt the slider down toward the outer periphery of the disk, whereby the antirolling effect can be regulated.

Figure 24A:
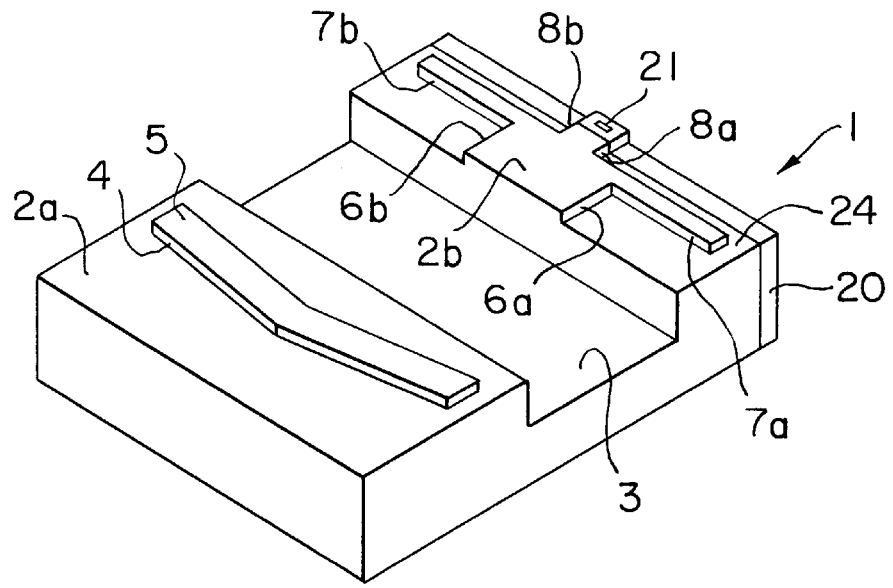
FIG. 24A is a perspective view of a head slider in a ninth embodiment according to the present invention.
Figure 24B:
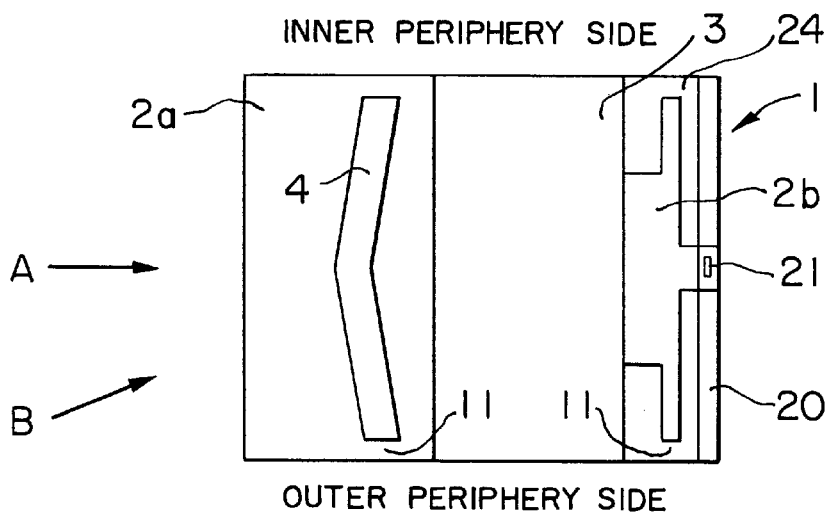
FIG. 24B is a plan view of the head slider of FIG. 24A.
Figure 24C:
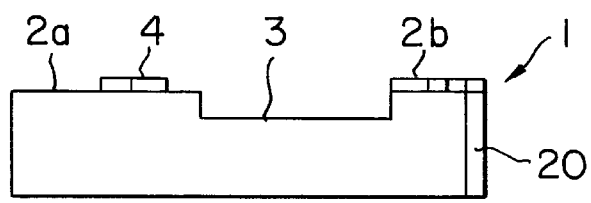
FIG. 24C is a side view of the head slider of FIG. 24A.

The length of the front dynamic pressure generating part in the rotating directin of the disk may be the mean distance between the front edge of the slider to the back edge of the V shape as shown in FIGS. 24A to 24C to meet the conditions for keeping the pitch angle of the slider regardless of the radial position of the slider relative to the disk as mentioend in the description of the first embodiment of the present invenion.

The foregoing embodiments capable of maintaining the flying height or the contact force constant regardless of the radial position of the slider 1 relative to the disk 31 without using yaw angle dependence are very suitable for moving an MR head for seek operation so that the yaw angle may not vary regardless of the radial position of the slider relative to the disk to prevent tracking dislocation when the slider is at a position corresponding to an inner or an outer peripheral portion of the disk.

As is apparent from the foregoing description, the slider in accordance with the present invention is capable of suppressing the transient variation of flying height through the reduction of yaw angle dependence and of maintaining flying height or contact force at which the read/write head is in contact with the disk constant regardless of the radial position of the slider relative to the disk.

The slider in accordance with the present invention is capable of flying at a low flying height or of keeping the read/write head in stable contact with the disk at a low contact pressure, so that a recording-and-reproducing employing the slider of the present invention is able to record information in an enhanced recording density.

While the presently preferred embodiments of the present invention have been shown and described, it is to be understood that this disclosure is for the purpose of illustrate and that various changes and modifications may be made without departing from the scope of the invention as set forth in the appended claims.

What is claimed is:

1. A head slider for supporting a read/write head above a rotating information recording medium, comprising:

a first dynamic pressure generating part protruding from a forward portion of a surface of the head slider facing the medium and extending across the surface of the head slider substantially perpendicularly to a rotating direction of the medium;

a second dynamic pressure generating part protruding from a rearward portion of the surface of the head slider and extending across the surface of the head slider substantially perpendicularly to the rotating direction of the medium, the second dynamic pressure generating part comprising a base portion protruding from the surface of the head slider and an end portion protruding from the base portion, a rearward-most edge of the first dynamic pressure generating part and a forward-most edge of the base portion of the second dynamic pressure generating part defining edges of a groove disposed between the first dynamic pressure generating part and the second dynamic pressure generating part; and a land provided on the first dynamic pressure generating part, the land protruding toward the medium and extending in a direction in which the front dynamic pressure generating part extends, the land having a length in the rotating direction of the medium in the range of 10% to 50% of a length of the first dynamic pressure generating part in the rotating direction of the medium, the end portion of the second dynamic pressure generating part comprising forward-most and rearward-most surfaces extending substantially perpendicularly to the medium and substantially perpendicularly to the direction of rotation of the medium, outer-most surfaces extending substantially perpendicularly to the medium and substantially in the rotating direction of the medium, first shoulders comprising first surfaces extending from the forward-most surface substantially perpendicularly to the medium and substantially in the rotating direction of the medium, second shoulders intersecting the first shoulders and comprising second surfaces extending from the outer-most surfaces substantially perpendicularly to the medium and substantially perpendicularly to the rotating direction of the medium, third shoulders comprising third surfaces extending from the rearward-most surface substantially perpendicularly to the medium and substantially in the rotating direction of the medium, and fourth shoulders intersecting the third shoulders and comprising fourth surfaces extending from the outer-most surfaces substantially perpendicularly to the medium and substantially perpendicularly to the rotating direction of the medium.

2. A recording-and-reproducing apparatus comprising:

an information recording medium supported for rotation;

a read/write head for reading information from and writing information on the medium;

a head slider having a surface facing the medium and supporting the read/write head; and an actuator supporting the head slider to move the head slider over the medium;

the head slider comprising: a first dynamic pressure generating part protruding from a forward portion of a surface of the head slider facing the medium and extending across the surface of the head slider substantially perpendicularly to a rotating direction of the medium;

a second dynamic pressure generating part protruding from a rearward portion of the surface of the head slider and extending across the surface of the head slider substantially perpendicularly to the rotating direction of the medium, the second dynamic pressure generating part comprising a base portion protruding from the surface of the head slider and an end portion protruding from the base portion, a rearward-most edge of the first dynamic pressure generating part and a forward-most edge of the base portion of the second dynamic pressure generating part defining edges of a groove disposed between the first dynamic pressure generating part and the second dynamic pressure generating part; and a land provided on the first dynamic pressure generating part, the land protruding toward the medium and extending in a direction in which the front dynamic pressure generating part extends, the land having a length in the rotating direction of the medium in the range of 10% to 50% of a length of the first dynamic pressure generating part in the rotating direction of the medium, the end portion of the second dynamic pressure generating part comprising forward-most and rearward-most surfaces extending substantially perpendicularly to the medium and substantially perpendicularly to the direction of rotation of the medium, outer-most surfaces extending substantially perpendicularly to the medium and substantially in the rotating direction of the medium, first shoulders comprising first surfaces extending from the forward-most surface substantially perpendicularly to the medium and substantially in the rotating direction of the medium, second shoulders intersecting the first shoulders and comprising second surfaces extending from the outer-most surfaces substantially perpendicularly to the medium and substantially perpendicularly to the rotating direction of the medium, third shoulders comprising third surfaces extending from the rearward-most surface substantially perpendicularly to the medium and substantially in the rotating direction of the medium, and fourth shoulders intersecting the third shoulders and comprising fourth surfaces extending from the outer-most surfaces substantially perpendicularly to the medium and substantially perpendicularly to the rotating direction of the medium.

* * * * *

UNITED STATES PATENT AND TRADEMARK OFFICE
CERTIFICATE OF CORRECTION

PATENT NO. : 5,917,678

DATED : June 29, 1999

INVENTOR(S) : Jun Ito, et al.

It is certified that error appears in the above-identified patent and that said Letters Patent is hereby corrected as shown below:

On the title page, insert:

-- [30]  Foreign Application Priority Data
September 29, 1995  [JP]     Japan..........................7-253299

Signed and Sealed this

Twenty-first Day of September, 1999

Attest:

Q. TODD DICKINSON

*Attesting Officer*    *Acting Commissioner of Patents and Trademarks*